(12) United States Patent
Banus

(10) Patent No.: US 9,221,190 B2
(45) Date of Patent: Dec. 29, 2015

(54) PRODUCTION PLANT FOR FORMING ENGINEERED COMPOSITE STONE SLABS

(71) Applicant: Christopher T Banus, Nashua, NH (US)

(72) Inventor: Christopher T Banus, Nashua, NH (US)

( * ) Notice: Subject to any disclaimer, the term of this patent is extended or adjusted under 35 U.S.C. 154(b) by 0 days.

(21) Appl. No.: 14/798,985

(22) Filed: Jul. 14, 2015

(65) Prior Publication Data

US 2015/0314475 A1 Nov. 5, 2015

Related U.S. Application Data

(63) Continuation of application No. PCT/US2015/040154, filed on Jul. 13, 2015, and a continuation-in-part of application No. 14/729,823, filed on Jun. 3, 2015, which is a continuation-in-part of (Continued)

(51) Int. Cl.
*B28B 3/02* (2006.01)
*B28B 1/08* (2006.01)

(52) U.S. Cl.
CPC .............. *B28B 1/082* (2013.01); *B28B 3/022* (2013.01)

(58) Field of Classification Search
CPC .......... B28B 1/082; B28B 1/087; B28B 3/022
See application file for complete search history.

(56) References Cited

U.S. PATENT DOCUMENTS

| | | | |
|---|---|---|---|
| 5,248,466 A * | 9/1993 | Russell, III | B28B 5/04 264/333 |
| 2007/0244222 A1* | 10/2007 | Ghahary | C04B 20/0076 523/171 |
| 2008/0260883 A1* | 10/2008 | Toncelli | B28B 3/022 425/88 |

FOREIGN PATENT DOCUMENTS

| | | |
|---|---|---|
| DE | 2437411 A1 | 2/1976 |
| FR | 2069651 A5 | 9/1971 |
| GB | 2098126 A | 11/1982 |
| GB | 2127343 A | 4/1984 |
| KR | 20060107614 | 10/2006 |
| SU | 742130 A1 | 6/1980 |
| WO | 0043192 | 7/2000 |
| WO | 2003068468 A1 | 8/2003 |
| WO | 2005111726 A2 | 11/2005 |

OTHER PUBLICATIONS

EP Extended Search Report for EP12825491 date Nov. 12, 2014.
Office Action for CA Patent Application No. 2845865 dated Jun. 1, 2015.
Office Action for CN Patent Application No. 2012-80040810.9 dated Jun. 1, 2015.

(Continued)

*Primary Examiner* — James Sanders
(74) *Attorney, Agent, or Firm* — Maine Cernota & Rardin

(57) ABSTRACT

An engineered stone production plant includes a vacuum vibration press ("VVP") suspended above the ground, so that a conveyor belt and/or returning empty trays or molds from a curing oven to a mixing station can pass beneath the VVP. Rigid, self-supporting trays or molds can convey slabs through the plant on rollers, which allow independent horizontal movement of the slabs during spreading and coloring/veining of the slab mixture. Embodiments include air levitation for transporting slabs into and out of the VVP. The curing oven can be air-heated. The pressing plate can be sealed with the tray or mold by walls that extend downwardly from the press plate over a flexible covering sheet, by a gasket surrounding the pressing plate, or by an angle strip surrounding the slab mixture. In embodiments, the slab size can be changed by exchanging elastomeric mold walls, or by exchanging molds and pressing platens.

23 Claims, 17 Drawing Sheets

Related U.S. Application Data application No. 14/222,695, filed on Mar. 24, 2014, now Pat. No. 9,073,239, which is a continuation-in-part of application No. 13/875,691, filed on May 2, 2013, now abandoned, which is a continuation-in-part of application No. PCT/US2012/051817, filed on Aug. 22, 2012.

(60) Provisional application No. 61/526,308, filed on Aug. 23, 2011, provisional application No. 61/767,272, filed on Feb. 21, 2013.

(56) References Cited

OTHER PUBLICATIONS

Office Action for EP Patent Application No. 12825491.9 dated May 27, 2015.
Office Action for KR Patent Application No. 2014-7007187 dated Aug. 28, 2015.
CN Search Report CN Appl. No. 201280040810.9, dtd Feb. 21, 2014, 3 pages.

* cited by examiner

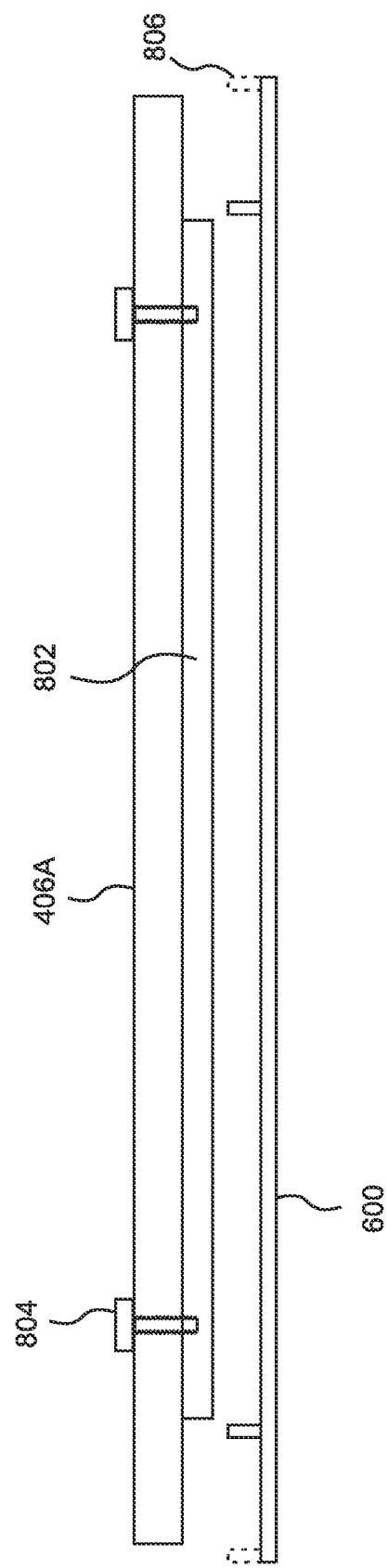

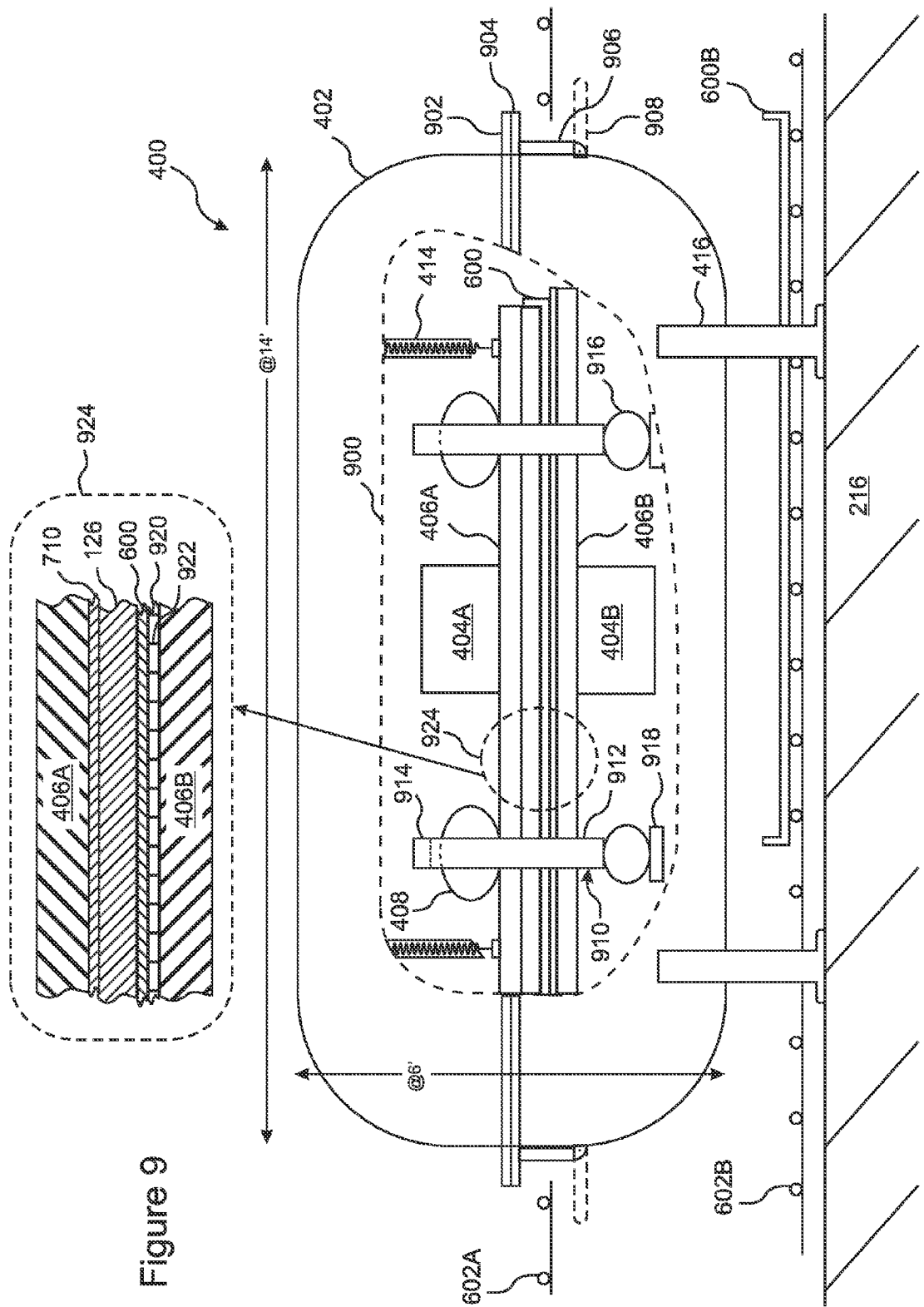

PRODUCTION PLANT FOR FORMING ENGINEERED COMPOSITE STONE SLABS

RELATED APPLICATIONS

This application is a US Bypass of PCT Application No. PCT/US15/40154 filed on Jul. 13, 2015. This application is also a continuation in part of U.S. application Ser. No. 14/729,823, filed on Jun. 3, 2015. U.S. application Ser. No. 14/729,823 is a continuation in part of U.S. application Ser. No. 14/222,695, filed on Mar. 24, 2014, now issued U.S. Pat. No. 9,073,239. U.S. application Ser. No. 14/222,695 is a continuation in part of U.S. application Ser. No. 13/875,691, filed on May 2, 2013, which is a continuation in part of PCT Application No. PCT/US2012/051817, filed on Aug. 22, 2012, which claims the benefit of U.S. Provisional Application No. 61/526,308, filed Aug. 23, 2011. U.S. application Ser. No. 13/875,691 also claims the benefit of U.S. Provisional Application No. 61/767,272, filed on Feb. 21, 2013. All of these applications are herein incorporated by reference in their entirety for all purposes.

FIELD OF THE INVENTION

The invention relates to engineered stone slabs, also known as Breton stone slabs or Quartz slabs, and more particularly, to production plants for fabricating engineered stone slabs.

BACKGROUND OF THE INVENTION

Engineered stone slabs are a specialized, non-porous, high performance type of composite stone slab that emulates both the physical and visual properties of natural stone slabs. The term "composite stone" is very broad, and can be applied to any material that is formed by adhering stone particles together. The most common forms of composite stone, such as asphalt, normal cement, or polymer cement, are not intended to emulate natural stone, and do not even remotely approximate the physical properties or appearance of natural stone slabs.

Engineered stone slabs, on the other hand, are a very specialized sub-category of composite stone slab which, until recently were fabricated exclusively using a specialized and highly expensive type of engineered stone production plant invented by M. Toncelli of Breton S.p.A, and marketed by Breton since the 1980's. More recently, copies of the Breton production plant design have been manufactured and sold by other sources, but the Breton production plant design remained the only plant design that was known to be capable of producing engineered stone until the present invention. Accordingly, engineered stone slabs are also sometimes referred to as "Bretonstone slabs." Most commonly, a high percentage of the stone included in an engineered stone slab is quartz. Therefore, engineered stone slabs are also sometimes referred to as "Quartz slabs." Other terms for this highly specialized type of stone slab are "ES-BS" (Engineered Stone-Breton Stone) slabs or "ES-BS-QS" (Engineered Stone-Breton Stone-Quartz Stone) slabs. Similarly, the production plant that has been used up until now to manufacture all engineered stone slabs is often revered to as the Breton production plant or Bretonstone plant, and the vacuum vibration press ("VVP") that is included in the Breton stone plant is often referred to as a Breton press.

With reference to FIG. 1A, the slab mixture 126 used for fabricating ES-BS slabs typically includes about 55-65% stone granules 128, 22-30% −325 mesh stone powder, and between 6% and 10% resin binder, which is a liquid composed of resin, pigment, and additives. In specialized cases, mainly when crystobolite powder is substituted for quartz powder, the percentage of resin can go as high as 12% due to the very high surface roughness of crystobolite particles. Otherwise, the resin is typically 10% or less. This resin binder, combined with the −325 mesh powder, forms a binding paste 130 that binds together the stone granules 128 to form the ES-BS slab. A slab mixture containing more than 15% liquid is not, by definition, an ES-BS slab mixture.

Because of the relatively low percentage of resin binder in engineered stone (typically 6% to 10%), as compared for example to the relatively high amount of water or polymer binder in concrete, there is insufficient binder in an engineered stone slab mixture to fill all of the voids between the stone granules 128 as they are naturally arranged after mixing. As a result, an engineered stone slab mixture initially contains much entrained air 134. And because there is insufficient resin to fill the voids, gentle shaking and vibrating will only cause settling of the mixture, without eliminating the voids between the stone granules, and cannot transform an engineered stone mixture into a void-free article.

Accordingly, it is necessary when fabricating an ES-BS stone slab 132 to force the stone granules 128 in the slab mixture into a "close-packed" configuration, as illustrated in FIG. 1B, wherein the stone granules 128 are migrated under intense pressure and strong vibration from their natural, essentially random distribution, as shown in FIG. 1A, into a space-filling, close-packed arrangement that minimizes the total void volume between the stone granules 128, as is illustrated in FIG. 1B. If this close-packed stone granule configuration is not achieved, there will be insufficient binding paste 130 to completely fill all of the voids between the stone granules 128, and it will therefore be impossible to produce a non-porous slab having properties and appearance similar to natural stone slabs. At best, the result will be a porous slab with very poor qualities and appearance. The close-packed arrangement of the stone granules and the achievement thereby of a non-porous result, when the starting mixture contains too little resin to fill all the voids without close packing, is a defining feature of an engineered stone slab.

Definitions of Terms

Note that the following terms are used with the indicated definitions throughout this paper.

Composite Stone: Composite stone refers to all materials that are made by using some type of binder to glue together any type of stone materials, such as sand, gravel, marble, broken clay pieces, glass, mirror, quartz, or granite. Virtually any naturally occurring mineral or other inorganic material that is hard relative to the intended end use of the composite stone article can be used. There are many types of composite stone, including for example concrete, terrazzo, concrete blocks, concrete or cementitioius pavers and slabs, large concrete slabs as are used for manufacturing buildings or bridge decks, concrete road pavements, polymer concrete slabs and articles, decorative marble-based cementitious or resinous slabs, and finally, engineered stone slabs.

Engineered Stone slabs, also referred to as Bretonstone slabs, Quartz Slabs, (ES-BS) Slabs, or ES-BS-QS slabs. These terms are used synonymously herein to refer to a special class of composite stone slabs that contain more than 85% stone content and less than 15% resinous binder. The slabs are nonporous, having no voids in the interior or on the surface of the slab, and closely emulate the appearance and physical properties of natural stone slabs. Until the present invention, all such slabs were produced using a specialized and costly vacuum vibration press invented about 25 years ago by Breton S.p.A, and procured either from Breton, or more recently from other sources producing copies of the Breton design. The invention of engineered stone and the invention of the Breton press coincided, since the Breton press was designed specifically to produce engineered stone, and until the present invention engineered stone could only be produced using a press of the Breton design.

Stone Granules (SG), also referred to herein as granules or aggregates: This term refers generically to particles of stone (typically quartz or silica based stone), or of other hard materials (such as glass, granite, marble, and such like), having sizes in the range from about 0.2 mm up to 2-3 centimeters.

Quartz Powder (QP), also referred to herein as silica powder and filler: These terms refer to powdered material ranging in particle size from about 1 micron to about 300 microns in diameter. In the industry, QP is typically finely crushed and/or milled quartz or silica sand. It is readily available worldwide in a generally standard minus 325 ("−325") mesh size, and can be made from marble (calcium carbonates), silica, quartz, glass, granite, or any other material that can be powdered and used for making quartz slabs. A special form of Quartz, known as crystobolite (made by heating quartz to over 1000 deg C) is also used because of its unique whiteness. Due to the high surface roughness of crystobolite particles, and the correspondingly high oil absorption, an additional 1% to 2% resin is typically needed to wet the surfaces of the crystobolite granules, in addition to the 6% to 10% resin needed to fill in the gaps between the granules. Accordingly, for crystobolite-based ES-BS slabs, typically between 8% and 12% total resin is needed.

Resin: This term is used herein to refer to any resin and/or adhesive system capable of adhering together stone granules and quartz powder to form an engineered stone slab. Examples include epoxy, urethane, acrylic, vinyl ester, silicone resins, and even cementitious adhesives based on the various forms of hydraulic type cements. When the resin is a polyester material, then it may include various additives that affect the cure rate, and especially the adhesion of the resin to silica and/or quartz based minerals and granites. In the quartz slab industry, the resin is, for economic reasons, typically a modified polyester thermosetting resin.

Vacuum Vibration Press (VVP): This term is used herein to refer to an apparatus that can simultaneously apply sufficient pressure, vibration, and vacuum to an engineered stone slab mixture to force the stone granules in the mixture into a close-packed relationship that enables the limited amount of resin paste in the mixture to fill all of the remaining voids between the stone granules. It is the achievement of this close-packed configuration that enables the manufacture of an engineered stone slab. Until the present invention, the only type of VVP that was able to apply sufficient vibration and pressure to created close-packing of an ES-BS slab mixture was the Breton style of VVP and copies thereof.

It is important to note that the terms Vacuum Vibration Press, Vacuum Vibrating Press, and VVP as used herein do not apply to all types of press that can simultaneously apply pressure, vibration, and vacuum to a slab mixture. For example, polymer concrete slabs are sometimes manufactured by a press that applies small amounts of pressure, vibration, and vacuum to a PC slab mixture. However, such an apparatus would not meet the definition of a VVP as used herein, because the polymer concrete press would not be able to apply sufficient pressure and vibrational energy to an engineered stone slab mixture to achieve close-packing of the stone granules.

It should be noted that such NC-PC forming devices which include both vacuum vibration and pressing are very rare, because generally the vacuum and pressing functions are unnecessary for settling and flattening NC-PC mixtures. When vacuum vibration and pressing are employed by an NC-PC device, the amounts of vibration and pressing forces these devices apply are a tiny fraction of the forces required for close packing of ES-BS slab mixtures.

Close Packing (CP): This term refers to a tightly packed arrangement of the stone granules in an ES-BS slab mixture, which does not occur naturally, but can only be achieved by the application of strong pressure and vibrations to the mixture (as well as vacuum to remove the entrained air in the mixture). The applied pressure provides the "motivation" for the granules to become close-packed, and the very intense vibration causes the stone granules to move and "jiggle," such that they are able to reorient and move past each other until a close-packed relationship is achieved. Achieving a close-packed arrangement of the stone granules in an ES-BS slab mixture is necessary for the production of ES-BS slabs.

Close Packing Energy (CPE): This term refers to a combination of high pressure and intense vibrational energy that is applied to the stone granules within an ES-BS slab mixture and is sufficient to force the stone granules in an ES-BS mixture to reorient and migrate into a close-packed arrangement. Until the present invention, the only press design that was capable of delivering CPE to an engineered stone slab mixture was the Breton design. Note that CPE is a combination of pressure and vibrational energy, and that different combinations of pressure and vibrational energy can provide CPE. Note also that the vibrational energy included in CPE is the vibrational energy that is present within the slab mixture, which will depend on the efficiency with which external "input" vibrational energy applied to the surface of the slab mixture is transmitted into the interior of the slab mixture.

Settling Energy (SE): this term refers to low to moderate vibration that is sufficient to cause a normal concrete mixture or polymer concrete mixture to settle, and to cause most air entrained in the mixture to rise to the surface, but is not sufficient to apply CPE to an engineered stone mixture. Note that the amount of SE that is required to settle a PC-NC slab mixture is dependent upon the total weight of the slab mixture being processed. Per square foot, the Settling Energy required for NC-PC slabs is only a small percentage of the CPE required for forming ES SLABS SLAB: When this term is used herein in all capital letters, it refers to an engineered stone slab having an area of approximately 44 square feet, and a thickness of between 1 cm and 3 cm. This size of slab is standard in the industry. Older versions of the Breton VVP made slightly smaller slabs, and later models make slightly larger slabs. But, the term SLAB is used herein to refer to the standard 44 square foot, 1-3 cm thick size of engineered stone slab. A 1 cm thick SLAB weighs approximately 230 lbs, a 2 cm thick SLAB weighs approximately 460 lbs, and a 3 cm thick SLAB weighs approximately 700 lbs.

Most of the figures and discussions presented herein are applicable to engineered stone slabs of any size. However, when specific dimensions are given for components of the disclosed production plant, these dimensions generally apply to a plant that is configured to produce either "jumbo" slabs, with dimensions @ 132"×62", or "standard" slabs, with dimensions @ 122"×54". Note that throughout the description and drawings presented herein, the symbol "@" is used to convey the meaning "approximately" or "substantially," according to the context.

Pressing: This term is used herein to refer to the process of simultaneously applying vacuum, pressure, and vibration to an engineered stone slab mixture in a combination that provides CPE to the ES-BS slab mixture, and thereby forces the stone granules in the mixture into a close-packed arrangement. Until the recent invention of the VVP disclosed in U.S. application Ser. No. 14/222,695 and the applications related thereto, the only style of VVP that could accomplish this was the Breton style press and copies thereof.

NC-PC composite stone: This term is used herein to refer generically to composite stone products in which the stone granules are not close-packed. Examples are "normal concrete" and "polymer concrete." In an NC-PC slab mixture, sufficient liquid is provided to fill all the voids between the stone granules as they are naturally arranged when the slab mixture is first prepared. As a result, only very modest vibration, and possibly a small amount of pressure are required to level the mixture and to encourage any entrained air bubbles to rise to the surface and be eliminated.

NC-PC Vibrating Table: This term is used herein to refer to an apparatus that is designed to produce an NC-PC product, and which is not capable of applying CPE to an engineered stone slab mixture, even though it might be able to apply more moderate levels of vibration to an NC or PC slab mixture, possibly with vacuum, and in rare cases also with a small amount of pressure.

The Breton Production Plant Design

The Bretonstone production plant design for making engineered stone slabs has been in use since the mid 1980's, and has remained unchanged in its principal design features, except for small modifications introduced periodically, such as the introduction of complicated a rubber mold system as an alternative to the earlier used paper sheet.

FIG. 1C illustrates the basic steps used to manufacture ES-BS slabs according to the Breton method. First, the slab mixture is prepared 100. Typically, this includes preparing a mixture containing about 65% stone granules 102 (small grains of 0.2 mm to 1 mm as well as aggregates pieces from 1 mm to 25 mm) such as crushed quartz, granite, mirror, and/or glass in granule sizes from 0.2 mm up to 6 mm or even 15 mm. About 25% "quartz powder" 104 is also included, where the term "quartz powder" generically refers to one or more powdered minerals such as silica and/or quartz (or crystobolite quartz powder), typically in an approximately minus 325 mesh (minus 45 micron) size. Finally, about 6 to 10% resin 106 is included, typically with additives such as catalyst 108, pigment blends 110, and dispersing media. It is also possible to make the ES-BS slabs with marble or calcium carbonate based powders and granules, although the finished product will have lower scratch/abrasion resistance and lower chemical resistance.

After the raw materials are weighed and measured, they are transported to a mixer 112 and mixed together 114. Typically, the mixer is charged with the stone granules, the resin, pigments, additives, etc are added, and the combination is mixed until the particles and granules are fully wetted. For purposes of color design, two, three, or more mixers may be employed, each with a different color of raw materials and pigments. This is illustrated in FIG. 1D.

The quartz powder is then added while the mixing continues. When combined with the resin, the quartz powder forms a binding paste that serves as the binder between the stone granules. The mixed materials are then formed into a single slab 116, either in a rubber mold, a metal mold, or on a sheet of paper or other suitable carrier which can be used to transport the formed slab into the vacuum vibration press (VVP). Note that the order of addition of the various materials can sometimes be changed for efficiency or other reasons.

As illustrated in FIG. 1A, when the engineered stone mixture 126 is mixed and placed in the mold, there is insufficient resin and powder to fill all the voids between the stone granules 128, and so the mixture contains a significant amount of engrained air 134, and therefore functions as a 2-phase system, where Phase 1 is the grains and aggregate pieces 128, and Phase 2 is the binding paste 130. The mixture is difficult to move, and appears almost dry because of the small percentage of binding paste and the large percentage of stone granules. Entrained air will not and cannot "rise" out of the mixture 126 if only vibration is applied, because the resin and powder binder is so dry and rigid that it traps the air, and also holds the granules in their naturally occurring, "open" (i.e. not close packed) arrangement.

A typical Breton engineered stone production plant is illustrated in FIG. 2. The slab mixture is prepared in a 3.5 story tall mixing station 200 that includes one or more large batch mixers, one or more color blenders, and a spreader conveyor belt 202 to transport the slab mixture 224 to a spreader 204, which then distributes the slab mixture 224 onto a transport conveyor belt 206 that transports the uncompressed slab 126 into the vacuum vibration press 208 and then transports the compressed slab 132 to the oven system 210. Note that to change colors in a Breton plant requires the cleaning work of 6 people for @ 5-6 hours. Also, the Breton style mixing station can cost between US $2.5 million and US $3.5 million.

A void-free compressed slab 132 can only be formed from the uncompressed mixture 126 if the stone granules 128 are compacted into a close-packed configuration (see FIG. 1B), so that the two phases are merged. Therefore, when the mixed material 224 is spread and formed into a slab 126 on the transport conveyor 206, it is generally 15-50% thicker than the finished slab 132 will be after pressing, because the granules 128 have not yet been forced into a close-packed relationship. For example, for a 2 cm thick SLAB, the spread and leveled material could be 2.3 to 3 cm thick before the pressing. If this mixture were processed in an NC-PC press, which would not be able to apply CPE to the mixture, the mixture after pressing would still be 10-30% thicker than if CPE had been applied, and would be porous, because the stone granules would be in a normal, non-compacted relationship, and so the mixture would still contain a significant amount of entrained air. Note that there is no existing NC-PC vibrating table or vibrating-press table that is able to apply even a small fraction of the pressure and vibration required to apply CPE to an engineered stone slab mixture.

Once the formed slab mixture 126 has been transferred to the press 208, it is simultaneously evacuated, vibrated, and pressed 118 in the Breton type VVP 208 so as to compact the mixed material 126 by forcing the granules into a close-packed arrangement 132, thereby minimizing the void volume between the granules 128 so that the small percentage of binding paste 130 is sufficient to fill all remaining space between the granules 128, and there will be no voids 134 in the finished non-porous slab 132.

Once the slab 132 has been pressed, it is transported by the transport conveyor belt 208 to an oven 210 or to some other location for curing 120. Depending upon the adhesive (resin) used to bind the particles together into the slab, the curing and hardening process can take place at ambient temperature or at an elevated temperature, and can require from a few minutes up to many hours. After curing and hardening, the slab 132 is returned to room temperature (if heat has been applied).

The typical Breton curing oven 210 includes about 18 pairs of oil-heated plates 212 that are applied to the tops and bottoms of each of 18 pressed slabs 132 that are horizontally arranged above each other in the oven 210. This approach consumes a significant amount of energy, and is not easily adapted to use with slabs of varying sizes.

In a typical Breton plant design, the oven 210 extends 1 story below ground and 2 stories above ground. It generally consists of 16-20 pairs of aluminum plates 212 which sandwich the slabs 132 after pressing. Each of the pairs of heating plates 212 must be configured to open a space between them, allow the slab 132 to be inserted therein, and then close together to sandwich the slab 132 therebetween during heating. The heating of the plates 212 is accomplished by pumping hot oil through them. This heating system is very complex, and includes many hoses (not shown), which must extend up and down in the elevator system as the pairs of plates 212 are moved up and down for loading, curing and emptying. The Breton oven 210 is also very expensive. A typical Breton oven for curing @ 30-40 slabs per hour weighs about 50 tons, costs approximately 3 million US $, and requires frequent cleaning of the upper and lower heating plates for each slab, due to contamination of the heating plates by resin escaping from the slabs.

A well know and costly defect in the Breton oil-heated plate oven system, is that the temperature of the heated slabs 132 is not consistent, neither across the area of each individual slab nor from slab to slab at different levels in the oven system 210. The temperature variation can be up to +/−10° C. or more. Since the target curing temperature for polyester-based slabs (note that polyester is the most commonly used thermosetting resin) is about 80-100° C., a +/−10 degree variance is very problematic, because: 1) in order to get all areas of every slab to the same temperature, the slabs must remain in the oven for an extra 10-30 minutes; 2) when slabs cure at different temperature in different areas of the slab (or worse, if some areas do not reach complete cure) then the completed slab will have varying degrees of cure, and therefore varying degrees of slab shrinkage, leading to residual internal stress that can cause future bending or cracking.

After curing, the slab 132 is then calibrated and polished 122 to a desired thickness and finish, using technology similar to what is used to grind, calibrate, and then polish conventional natural granite stone slabs. The final result 124 is a finished ES-BS slab that is non-porous and closely approximates the appearance and physical properties of natural stone slabs. Note that the presence of a single void on the surface of a slab will render the slab "second quality," and more than two such voids will render the slab unsalable.

Disadvantages of the Breton Design

The Breton vacuum vibrating press (VVP) is effective in producing ES-BS slabs because it delivers a combination of high pressing force and very high vibration energy under vacuum that is sufficient to apply CPE to an engineered stone slab mixture, thereby forcing the stone granules into a close-packed arrangement. However, there are several disadvantages associated with the Breton style of VVP and production plant.

The disadvantages of the Breton VVP design, which are overcome by the new design recently introduced by the present inventor, are discussed in detail in the U.S. patent application Ser. Nos. 14/729,823 and 14/222,695. One of the disadvantages of the Breton VVP that leads directly to disadvantages in other parts of the Breton plant design is the fact that a Breton press 208 includes a 20 ton steel base 222, which must be anchored to a 300 ton vibration-damped block 214 of reinforced concrete that is set beneath the concrete floor 216. The vibration-damped block 214 is approximately 20' long by 15' wide by 20' deep. Its purpose is to force some of the applied vibration energy into the slab material 126, so that close packing can be achieved. Nevertheless, a Breton-style press 208 has a very low energy efficiency. Even with the 300+ ton base 222 and block 214 as an inertial mass that resists the rapid vibration movement that is delivered to the press plate 218 by the vibration device 220, only a small percentage of the vibrational energy goes into the slab material 126 to accomplish the required close packing. This is partly because the massive base 214 is only inertial, and is not actually a good "reflector" of vibrational energy back into the slab 126.

Due to the requirement for this massive inertial base 222, 214, the transport conveyor belt 206 in the Breton plant is forced to transit through the VVP 208 twice, so as to return in a loop. This double layer of conveyor belt 206 passing beneath the slab 126 further absorbs energy from the press, and causes the press to be even less efficient.

Comparison Between PC-NC Slabs and Bretonstone Slabs

So as to fully understand the present invention and how it is distinguished from the prior art, it is important to understand the distinctions between engineered stone slabs and other types of composite stone products and the devices that are designed to make them, referred to herein generically as PC-NC products and vibration tables. The vast majority of composite stone materials, mainly concrete and polymer concrete, are produced for structural and/or industrial purposes, while engineered stone is produced mainly for decorative purposes. There have been a few attempts during the last 30 years to produce a decorative non-Bretonstone composite stone product, but they have been mainly unsuccessful. These include PBI, which failed in the decorative market; Granitech, which also failed in the decorative market; GRANIT 90, which is still produced but in very small quantities, and RESPECTASTONE, which is currently not in the market because of its high resin content and unsatisfactory appearance and physical performance as compared to Bretonstone.

Because the purpose, design, and effect of the ES-BS and of the PC-NC devices and products produced are so different, expertise in one area does not translate easily into expertise in the other area. Experts in the field of Polymer Concrete and Normal Concrete (PC-NC) and experts in the field of Engineered Stone do not normally discuss the distinction between these materials and their very different energy-principals of compaction, simply because the produced products are in entirely different categories as to use and manufacturing principals. Nevertheless, there are very important distinctions that must be understood in order to understand the present invention.

Normal concrete and cement type mixtures have a high liquid content, and are generally liquid, flowing, and easy to move. Air bubbles entrained in the mixture are often not a problem, because they tend to rise out of the mixture due to the high liquid content. Relatively low energy vibration, applied to the outside of the container or by placing the vibrator head into the mixture, is sufficient to remove the entrained air and settle the mixture into the desired shape.

Polymer concrete: These mixtures have a lower liquid content than normal concrete, because polymer is expensive, but the liquid content is still much more than for an engineered stone mixture, and is adequate to wet all the grains and pieces of aggregate in the PC mixture. A PC mixture normally flows easily, and can typically be leveled and formed by the application of very modest vibration, although vacuum degassing may be used to remove the entrained air, and in rare cases a mild pressure may be applied, typically when the PC slab must be pressed onto a form to create a non-flat shape.

With reference to FIG. 3, in a normal concrete or polymer concrete mixture 324, after mixing, the stone granules 128 and smaller grains 326 are completely surrounded by a surplus of liquid 328, which is typically water, Portland cement slurry, or polymer. The mixture 324 is a single phase system, in that it is a liquid or semi-liquid "soup" containing more or less freely moving grains 326 and aggregate pieces 128.

Because there is sufficient liquid plus fine grains or powder to fill all the space between the grains 326 and aggregate pieces 128, an applied vacuum, or vacuum with moderate vibration, will cause any entrained air to rise to the surface and be removed, and will typically cause the mixture to flow into a mold, although sometimes gentle pressing is also applied, especially when forming non flat items. This combination of moderate vibration and pressure is referred to herein as "settling energy" or "SE."

A typical SE vibrational energy would be in the range of 1-5 HP per PC SLAB. This vibrational energy can be delivered by any number of NC-PC vibrating machines manufactured by hundreds of companies. Application of additional strong pressing and vibration to a normal concrete or polymer concrete mixture, for example at a level equivalent to CPE, would not further compact the mixture, because the mixture does not include any voids that can be filled or any other mechanism that would allow for further volume reduction. To the extent that the larger aggregates pieces 128 are moved closer together by SE, normally to the bottom of the mold, because their density is higher than the polymer-powder or water/cement binder, this process is similar to vibration-assisted sedimentation, and does not result in any special close packing of the settled pieces, or any reduction in volume.

In contrast, in manufacturing an ES-BS SLAB, the Breton-stone type of VVP applies CPE that includes an input vibration energy of more than 100 HP per SLAB.

There is also a very large difference in the pressure that is applied by a PC-NC press as compared to an ES-BS press. Typically, for a PC-NC press the pressing is solely for the purpose of flattening the PC-NC slab mixture, or to press a form down into the material in order to create a 3-d shape such as a trough or basin. As discussed above, because a PC-NC slab mixture contains enough liquid and powder to fill all of the voids between the grains and aggregates, the mixture is not compressible in volume. Hence only a very modest pressure needs to be applied by the platen or mold. Typically, a PC-NC press need only apply one or two psi to the slab mixture to accomplish the desired result.

In contrast, forcing the stone granules of an engineered stone mixture into a close-packed relationship requires an ES-BS Breton-style press to apply very high pressure to the slab mixture at the same time as the intense vibrations (and of course the applied vacuum). Typically, a Breton ES-BS press must apply between 20 and 50 psi.

There is also a significantly different relationship between slab size and required vibrational energy for PC-NC slabs as compared to ES-BS slabs. In the case of PC-NC materials, if the article to be vibrated is of lower weight, then proportionally less vibrational energy is required. However, this is not true for ES-BS slabs. The same very intense vibrational energy that is required for a 700 lb 3 cm thick SLAB is also required for a 250 lb 1 cm thick SLAB. Why? Because in the case of ES-BS materials, only a very small percentage of the vibrational energy (and pressing) is used as SE energy to flatten or mold the mixture, while most of the vibrational energy is applied as CPE energy to force the close packing of the grains and aggregates pieces, irrespective of the slab's weight.

What is needed, therefore, is a production plant for manufacturing engineered stone slabs that is much lower in manufacturing and operating costs, requires less maintenance, and is more flexible in terms of changing esthetic coloring and slab size than conventional Breton production plants.

SUMMARY OF THE INVENTION

A production plant for making engineered stone slabs and other engineered stone products costs less to manufacture and install, provides shorter press cycle times, and requires less energy consumption and maintenance than a Breton engineered stone production plant. The disclosed production plant includes a vacuum vibration press ("VVP") that applies as much or more CPE energy to a formed ES-BS mixture as a conventional Breton press, while weighing less and requiring less resin in the slab recipe. The VVP included in preferred embodiments of the present invention (which is discussed in detail in U.S. patent application Ser. Nos. 14/729,823 and 14/222,695) does not require the massive base of a Breton press, thereby allowing it to be at least partly suspended above the ground, so as to provide a passage beneath the VVP through which a conveyor belt and/or returning empty trays or molds can pass. In embodiments rigid, self-supporting trays or molds are used to convey the slabs through the plant. The ability to convey the empty trays or molds beneath the VVP and back to the mixing area for re-use is one of the primary reasons why it is practical and cost-effective to use rigid trays or molds in embodiments of the present invention, made for example from anodized aluminum, which might otherwise be too heavy and awkward to handle and transport.

Various embodiments use rollers to transport the self-supporting, rigid trays or molds to and from the press and the curing oven. In some of these embodiments, the trays or molds can be moved independently of each other in at least one horizontal direction. In embodiments, this ability to independently move the trays or molds simplifies the mechanism that deposits and spreads the slab mixture, and provides opportunities to include novel coloring and veining apparatus for enhancing the appearance of the slabs.

Certain embodiments include an air levitation system for transporting slabs into and out of the VVP. Embodiments allow relatively easy and inexpensive changing of the esthetic coloring applications and/or of the slab size being produced. Various embodiments also include a novel spreading, coloring, and veining apparatus. In addition, various embodiments include a novel, air-heated curing oven.

So as to better understand how these improvements are related, it is helpful to consider how the Breton press design limits the design of the entire Breton production plant. Due to the massive base of the Breton VVP, the only path available between the spreader and the oven is through the press itself. As a consequence, there is no practical way to automatically return slab-supporting trays or molds to the mixer. Instead, the slabs are deposited either onto paper sheets that are disposable and do not need to be returned and reused, or into lightweight rubber molds that are easy to handle and return manually to the spreader after use.

The paper sheets and rubber molds used in a Breton production plant are not supportive of the slabs, i.e. not self-supporting. For this reason, they must be transported on a conveyor belt that will maintain the flat shape of the slab as it is spread, transported into the VVP, pressed, and then transported to the oven. The use of a conveyor belt constrains the slabs to moving only in one direction, and prevents the slabs from moving independently of each other. As a result, the spreader must move relative to the conveyor belt when spreading the material for a slab. This significantly increases the cost and complexity of the spreader, and limits its flexibility. Furthermore, due to the massive base of the Breton VVP, the transport conveyor belt of the Breton production plant must pass through the press twice, as shown in FIG. 2, which wastes vibrational energy and significantly increases design complexity and maintenance requirements.

In view of the foregoing disadvantages of prior art production plants the object of the present invention is to create a production plant for forming engineered composite stone slabs which provides a return path for the slab-transporting mechanism and/or the slab-supporting structures beneath the vacuum vibration press.

The solution of the above object is provided by a production plant for forming engineered composite stone slabs comprising the features mentioned in claim 1.

In particular, because the VVP used in embodiments of the present invention does not require a massive base, a return path from the oven to the spreader can be provided beneath the VVP. As a result, the slabs can be deposited onto rigid trays or molds that are supportive of the slabs, and the empty trays or molds can be returned on a belt or rollers (or any other transport mechanism known in the art) beneath the VVP.

The limitation of the Breton design to paper or flexible rubber slab supports also means that the Breton curing oven system must provide rigid shelves that support the slabs during curing in the oven, making it impossible for heated air to flow easily and uniformly around the slabs. Instead, in the Breton oven design is forced to resort to sandwiching the slabs between rigid, oil-heated plates.

In contrast, preferred embodiments of the present invention include curing ovens that provide only limited support to rigid trays or molds, such as support rails along the sides, and thereby can allow heated air to flow freely through the interior, eliminating the need for oil heating of the slabs during curing.

In addition, the use of rigid, slab-supporting trays or molds allows the use of transport mechanisms, such as rollers and/or air-support systems, that allow independent movement of the slabs in any desired horizontal direction, so that the design of the spreader can be simplified.

Accordingly, preferred embodiments of the present invention include one or more of the following:

- A slab transporting system that includes a component which passes beneath the VVP
- A rigid tray or mold, which can be anodized aluminum;
- A continuous mixer;
- A spreader and/or coloring system that takes advantage of independent, horizontal movement of the slabs during spreading and/or coloring;
- An exchangeable press platen for changing slab size
- Exchangeable rubber mold walls for changing slab size and thickness A first general aspect of the present invention, referred to herein as embodiment 1A, is a production plant for forming engineered composite stone slabs. The production plant includes a vacuum vibration press capable of applying vacuum, pressure, and vibrational energy to a formed slab mixture deposited onto or into a slab supporting structure, said slab mixture comprising stone granules, stone powder, and a resin binder, said resin binder being no more than 15% of the slab mixture by weight, said vacuum, pressure, and vibrational energy being applied in a combination of amplitudes that is sufficient to compress said formed slab mixture into a close-packed configuration in which all voids between the stone granules and stone powder are filled by said resin binder, said vacuum vibration press being suspended above a supporting floor, so that a passage is provided between said vacuum vibration press and said supporting floor; and a slab transporting system configured to transport said formed slab mixture into and out of said vacuum vibration press, a portion of said slab transporting system being directed through said passage formed between said vacuum vibration press and said supporting floor.

Embodiments of this first general aspect including the following additional features:

1A1. The production plant of embodiment 1A, wherein the slab transporting system includes a conveyor belt that extends through said vacuum vibration press and returns through said passage between said vacuum vibration press and said supporting floor.

1A2. The production plant of embodiment 1A or 1A1, wherein the slab transporting system is configured to enable the slab supporting structure to move in at least two orthogonal directions while the slab mixture is deposited onto or into the slab supporting structure.

1A3. The production plant of any of embodiments 1A-1A2, wherein the slab transporting system includes rollers upon which the rigid tray or mold can be rolled, said rollers including rollers that allow said slab supporting structure, after said engineered stone slab is removed therefrom, to be rolled below said vacuum vibration press in preparation for deposition of slab mixture onto or into the slab supporting structure.

1A4. The production plant of any of embodiments 1A-1A3, wherein the slab transporting system is configured to enable a plurality of slab supporting structures to move independently of each other in at least one horizontal direction.

1A5. The production plant of any of embodiments 1A-1A4, further comprising a continuous mixer configured for preparing said slab mixture by mixing together said stone granules, stone powder, and resin binder.

1A6. The production plant of embodiment 1A5, wherein said continuous mixer can produce up to 100 kg per minute of the slab mixture.

1A7. The production plant of embodiment 1A5 or 1A6, wherein said continuous mixer can produce up to 300 kg per minute of the slab mixture.

1A8. The production plant of any of embodiments 1A-1A7, further comprising an air-cushion mechanism configured to support the formed slab mixture as it is transported into and out of the vacuum vibration press.

1A9. The production plant of any of embodiments 1A-1A8, wherein the slab transporting mechanism includes at least one slab elevator configured to adjust a height of the slab-transporting system above the supporting floor.

1A10. The production plant of any of embodiments 1A-1A9, wherein the slab supporting structure is a paper sheet or an elastomeric mold.

1A11. The production plant of any of embodiments 1A-1A10, wherein the slab-supporting structure is a mold having a flat center bounded by vertical walls, and said production plant further comprises a rigid cover plate configured for placement on top of the formed slab mixture within said vertical walls during pressing of the formed slab mixture.

1A12. The production plant of any of embodiments 1A-1A11, wherein the slab supporting structure is a rigid tray or a rigid mold.

1A13. The production plant of any of embodiments 1A-1A12, wherein the vacuum vibration press comprises a vibration table within a vacuum chamber, said vibration table being configured for supporting the formed slab mixture from below; a pressing mechanism within the vacuum chamber, said pressing mechanism being configured for applying pressure to the formed slab mixture from above; at least one lower vibration device cooperative with the vibration table; and at least one upper vibration device cooperative with said pressing mechanism.

1A14. The production plant of embodiment 1A13, further comprising a flexible cover sheet configured to overlay the formed slab mixture and to form a seal between the slab-supporting structure and the pressing mechanism during pressing of the formed slab mixture.

1A15. The production plant of embodiment 1A13 or 1A14, wherein the slab-supporting structure is a flat structure, and the pressing mechanism further includes extendable sides configured to be extended toward and pressed against the supporting structure during pressing of the formed slab mixture, thereby horizontally confining the formed slab mixture during the pressing.

1A16. The production plant of any of embodiments 1A13-1A15, wherein the slab-supporting structure is a mold having a flat center bounded by vertical walls, and the pressing mechanism further includes a surrounding gasket configured to form a seal between the pressing mechanism and the vertical walls of the mold during pressing of the formed slab mixture by the pressing mechanism.

1A17. The production plant of any of embodiments 1A13-1A16, wherein the slab-supporting structure is a mold having a flat center bounded by vertical walls, and said production plant further comprises at least one angled strip having two parallel, joined sections forming a substantially right angle therebetween, said angled strip being configured to extend one of said sections between the formed slab mixture and at least one of the vertical walls, while the other of said sections overlaps a top surface of the formed slab mixture, said angled strip thereby forming a seal between the at least one vertical wall of the mold and the pressing mechanism during pressing of the formed slab mixture.

1A18. The production plant of any of embodiments 1A13-1A17, wherein the slab-supporting structure is a mold having a flat bottom overlapped by vertical, elastomeric, removable walls having a first wall thickness, said walls being configured to form a seal between the flat bottom and the pressing mechanism during pressing of the formed slab mixture.

1A19. The production plant of embodiment 1A18, wherein an interior dimension of said mold can be changed by replacing at least one of said removable walls with a wall having a second wall thickness that differs from the first wall thickness.

1A20. The production plant of embodiment 1A18 or 1A19, wherein the elastomeric, removable walls are formed by a single, rectangular, elastomeric form that is configured to surround the formed slab mixture in the mold.

1A21. The production plant of any of embodiments 1A13-1A20, further comprising a plurality of slab-supporting molds having flat centers bounded by vertical walls and a plurality of platens configured to fit within the vertical walls of corresponding molds, said platens being exchangeably attachable to a bottom surface of a pressing plate included in the pressing mechanism, at least one dimension of the formed slab mixture being selectable from among a plurality of sizes by selecting a corresponding mold and platen from among said pluralities of molds and platens.

1A22. The production plant of any of embodiments 1A-1A21, further comprising a curing oven configured for heating the formed and pressed slab mixture by exposing the formed and pressed slab mixture to heated air.

1A23. The production plant of embodiment 1A22, wherein the curing oven includes a cooling section configured to allow the hardened engineered stone slab to return to ambient temperature after the curing thereof.

A second general aspect of the present invention, referred to herein as embodiment 2A, is a production plant for forming void-free engineered composite stone slabs from a slab mixture comprising stone granules, stone powder, and a resin binder, said resin binder being no more than 15% of the slab mixture by weight, the production plant comprising a curing oven configured for heating a formed and pressed slab mixture by exposing the formed and pressed slab mixture to heated air.

A third general aspect of the present invention, referred to herein as embodiment 3A, is a pressing system for forming void-free engineered composite stone slabs from a slab mixture comprising stone granules, stone powder, and a resin binder, said resin binder being no more than 15% of the slab mixture by weight. The pressing system includes a slab supporting structure onto or into which the slab mixture is deposited as a formed slab mixture, and a vacuum vibration press that includes a vibration table within a vacuum chamber, said vibration table being configured for supporting the formed slab mixture from below. Embodiment 3A further includes a pressing mechanism within the vacuum chamber, said pressing mechanism being configured for applying pressure to the formed slab mixture from above, and a sealing mechanism configured to form a seal between the pressing mechanism and the slab supporting structure.

Embodiments of this third general aspect including the following additional features:

3A1. The pressing system of embodiment 3A, wherein the slab-supporting structure is a flat structure, and the pressing mechanism further includes extendable sides configured to be extended toward and pressed against the supporting structure during pressing of the formed slab mixture, thereby horizontally confining the formed slab mixture during the pressing.

3A2. The pressing system of embodiment 3A or 3A1, wherein the slab-supporting structure is a mold having a flat center bounded by vertical walls, and the pressing mechanism further includes a surrounding gasket configured to form a seal between the pressing mechanism and the vertical walls of the mold during pressing of the formed slab mixture by the pressing mechanism.

3A3. The pressing system of any of embodiments 3A-3A2, wherein the slab-supporting structure is a mold having a flat center bounded by vertical walls, and said pressing mechanism further comprises at least one angled strip having two parallel, joined sections forming a substantially right angle therebetween, said angled strip being configured to extend one of said sections between the formed slab mixture and at least one of the vertical walls, while the other of said sections overlaps a top surface of the formed slab mixture, said angled strip thereby forming a seal between the at least one vertical wall of the mold and the pressing mechanism during pressing of the formed slab mixture.

3A4. The pressing system of any of embodiments 3A-3A3, wherein the slab-supporting structure is a mold having a flat bottom overlapped by vertical, elastomeric, removable walls having a first wall thickness, said walls being configured to form a seal between the flat bottom and the pressing mechanism during pressing of the formed slab mixture.

3A5. The pressing system of embodiment 3A4, wherein an interior dimension of said mold can be changed by replacing at least one of said removable walls with a wall having a second wall thickness that differs from the first wall thickness.

3A6. The pressing system of embodiment 3A4 or 3A5, wherein the elastomeric, removable walls are formed by a single, rectangular, elastomeric form that is configured to surround the formed slab mixture in the mold.

3A7. The pressing system of any of embodiments 3A-3A6, further comprising a plurality of slab-supporting molds having flat centers bounded by vertical walls and a plurality of platens configured to fit within the vertical walls of corresponding molds, said platens being exchangeably attachable to a bottom surface of a pressing plate included in the pressing mechanism, at least one dimension of the formed slab mixture being selectable from among a plurality of sizes by selecting a corresponding mold and platen from among said pluralities of molds and platens.

A fourth general aspect of the present invention, referred to herein as embodiment 4A, is a method for forming engineered composite stone slabs. The method includes preparing a slab mixture comprising stone granules, stone powder, and a resin binder, said resin binder being no more than 15% of the slab mixture by weight, using a slab spreader to deposit said slab mixture onto or into a slab supporting structure as a formed slab mixture, using a slab transporting mechanism to transport said formed slab mixture into a vacuum vibration press, a portion of said slab transporting system being directed through a passage formed between said vacuum vibration press and a supporting floor, using the vacuum vibration press to apply vacuum, pressure, and vibrational energy to the formed slab mixture in a combination of amplitudes that is sufficient to compress said formed slab mixture into a close-packed configuration in which all voids between the stone granules and stone powder are filled by said resin binder, using said slab transporting mechanism to transport said pressed formed slab mixture out of said vacuum vibration press, curing said formed slab mixture to form an engineered stone slab, removing said engineered stone slab from said slab transporting structure, and returning said slab supporting structure to said slab spreader.

Embodiments of this fourth general aspect including the following additional features:

4A1. The method of embodiment 4A, wherein returning said slab supporting structure to said slab spreader includes using said slab transporting mechanism to return said slab supporting structure to said slab spreader.

4A2. The method of embodiment 4A or 4A1, wherein preparing the slab mixture includes using a continuous mixer to mix together the stone granules, stone powder, and resin binder.

4A3. The method of any of embodiments 4A-4A2, wherein using the slab spreader to deposit said slab mixture onto or into said slab supporting structure includes moving the slab supporting structure beneath the slab spreader as the slab mixture is deposited onto or into the slab supporting structure.

4A4. The method of any of embodiments 4A-4A3, wherein the slab supporting structure is a rigid tray or mold.

4A5. The method of embodiment 4A4, wherein the slab transporting mechanism includes rollers.

4A6. The method of embodiment 4A4 or 4A5, wherein the method further includes curing the pressed formed slab mixture by exposing the slab mixture to heated air in a curing oven.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 8E is a cross-sectional side view of a pressing plate having a platen attached thereto, wherein the size of the slab can be selected by selecting a platen and mold having corresponding sizes;

FIG. 9 is a sectional side view of a VVP in an embodiment of the present invention;

DETAILED DESCRIPTION

A production plant for making engineered stone slabs and other engineered stone products costs less to manufacture and install, provides shorter press cycle times, and requires less energy consumption and maintenance as compared to a Breton engineered stone production plant. Embodiments further allow relatively easy and inexpensive changing of the esthetic coloring applications and/or of the slab size being produced.

Figure 1B:
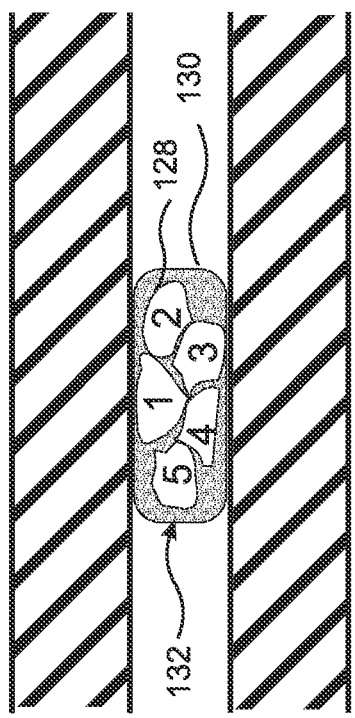
FIG. 1B is a cross-sectional illustration of the composite stone mixture of FIG. 1A after close-packing, showing the resin and powder filling all the entire space between the stone granules, with no voids.
Figure 1A:
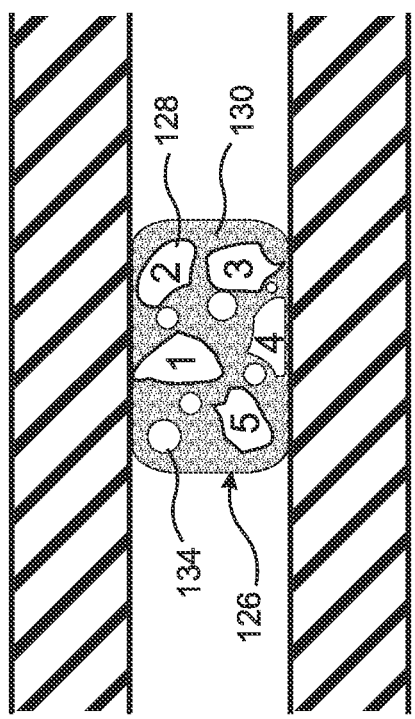
FIG. 1A is a cross-sectional illustration of stone granules, resin, and voids in an engineered stone mixture before close-packing.
Figure 1C:
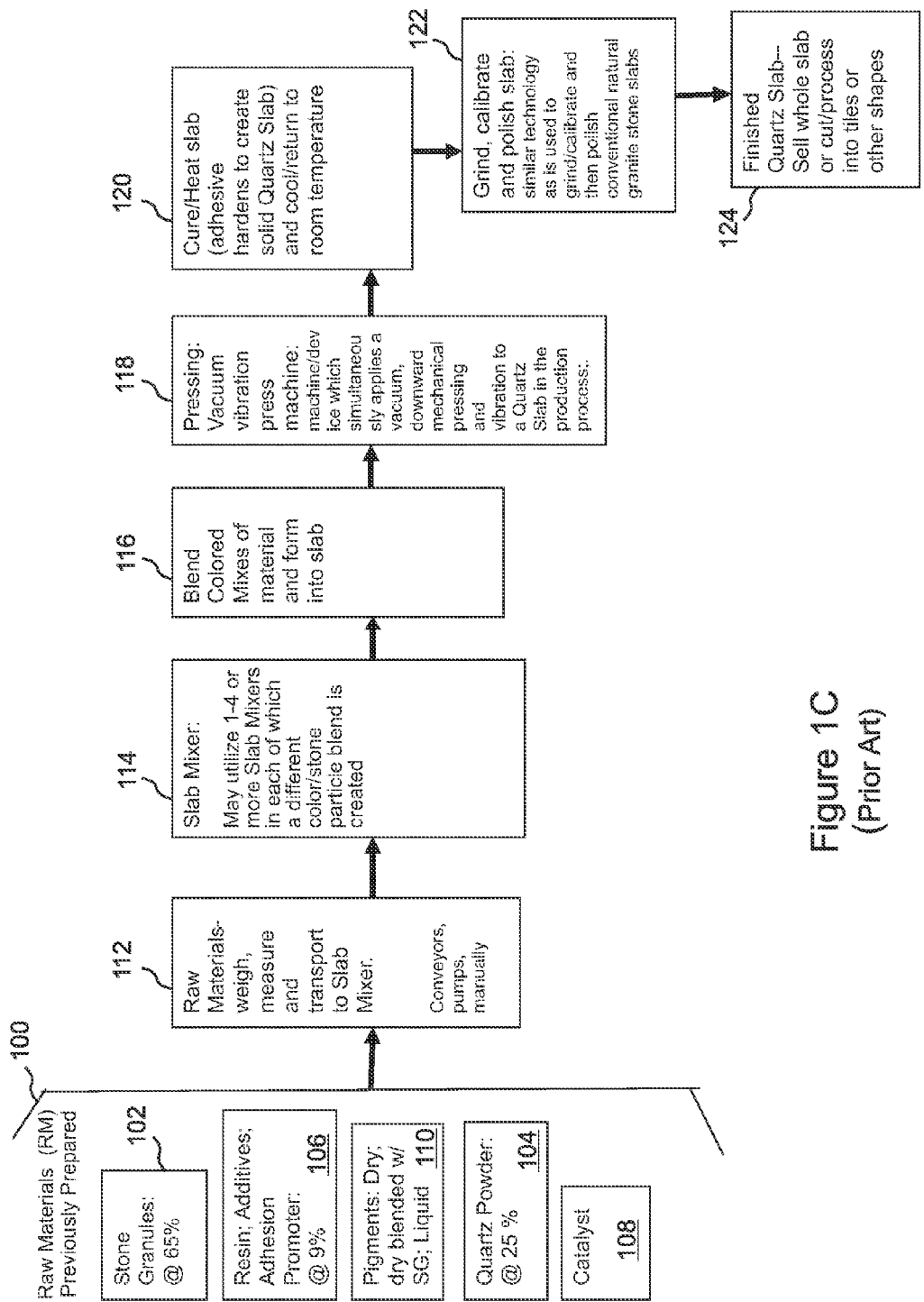
FIG. 1C is a flow diagram illustrating the overall production process for making composite stone slabs according to the traditional Breton process of the prior art.
Figure 1D:
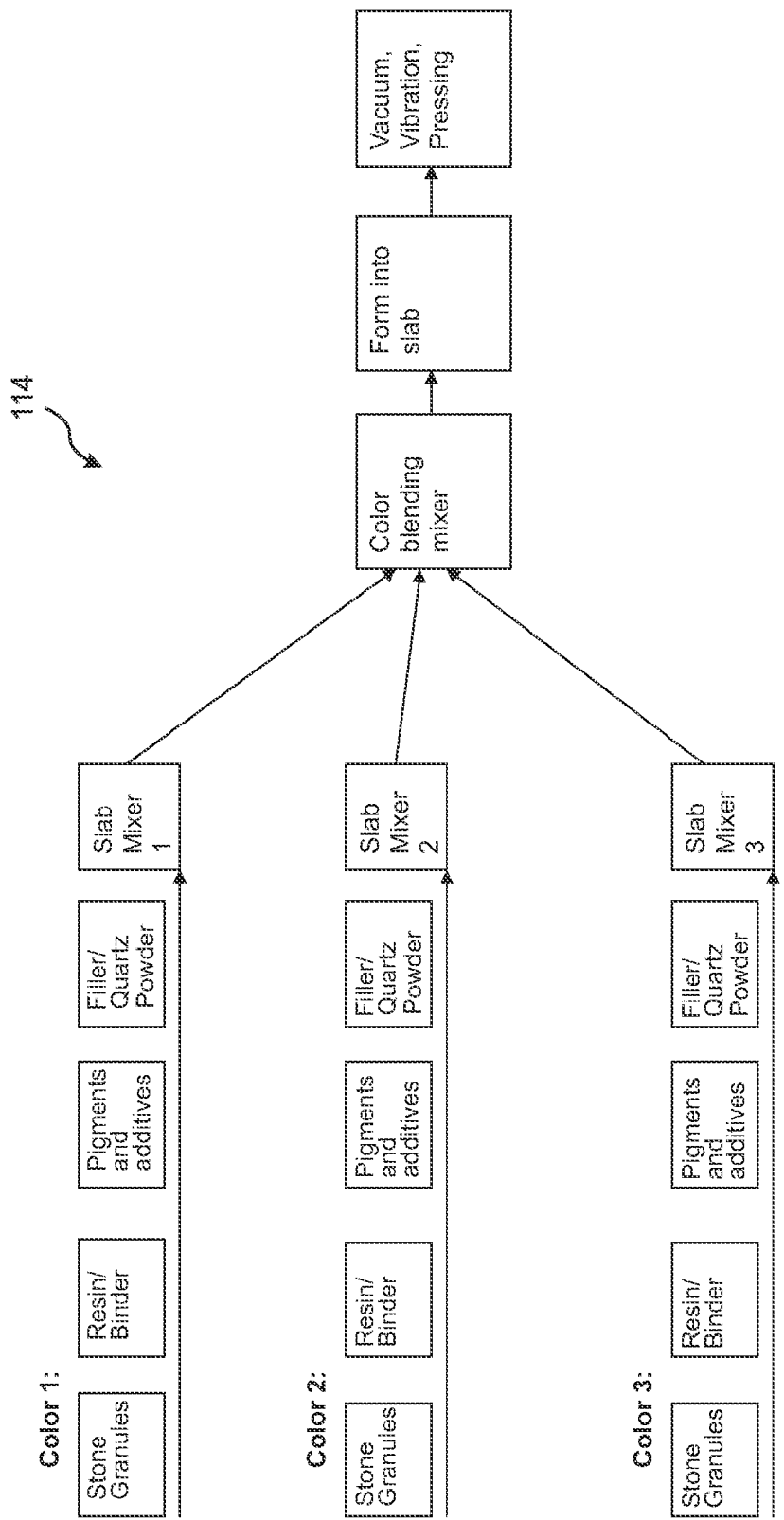
FIG. 1D is a flow diagram illustrating the mixing and combining of a plurality of powder, stone particles, and other components having different colors and/or other differing properties, according to the traditional Breton process of the prior art.
Figure 2:
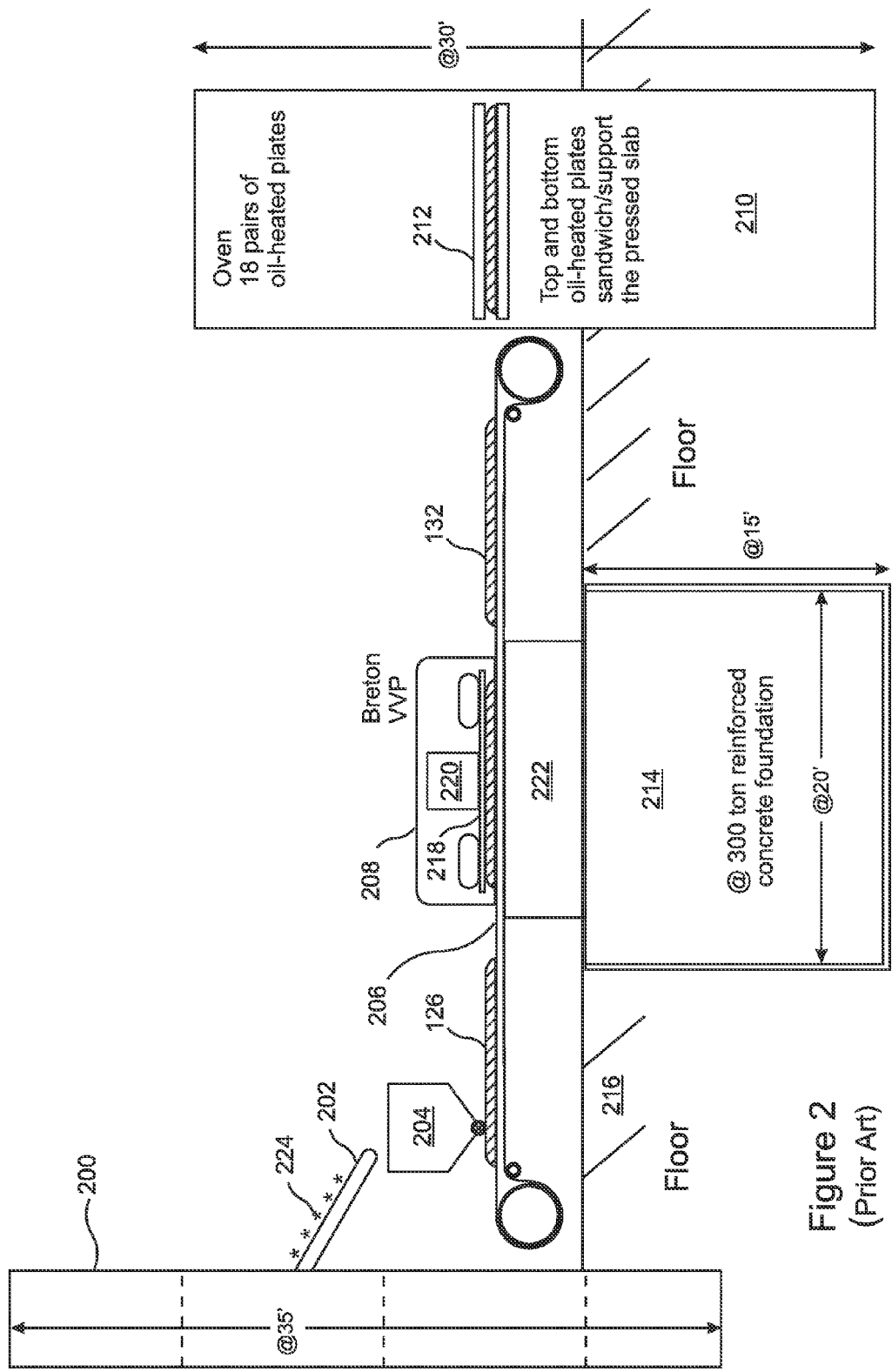
FIG. 2 is a block diagram illustrating an engineered stone production plant of the prior art.
Figure 3:
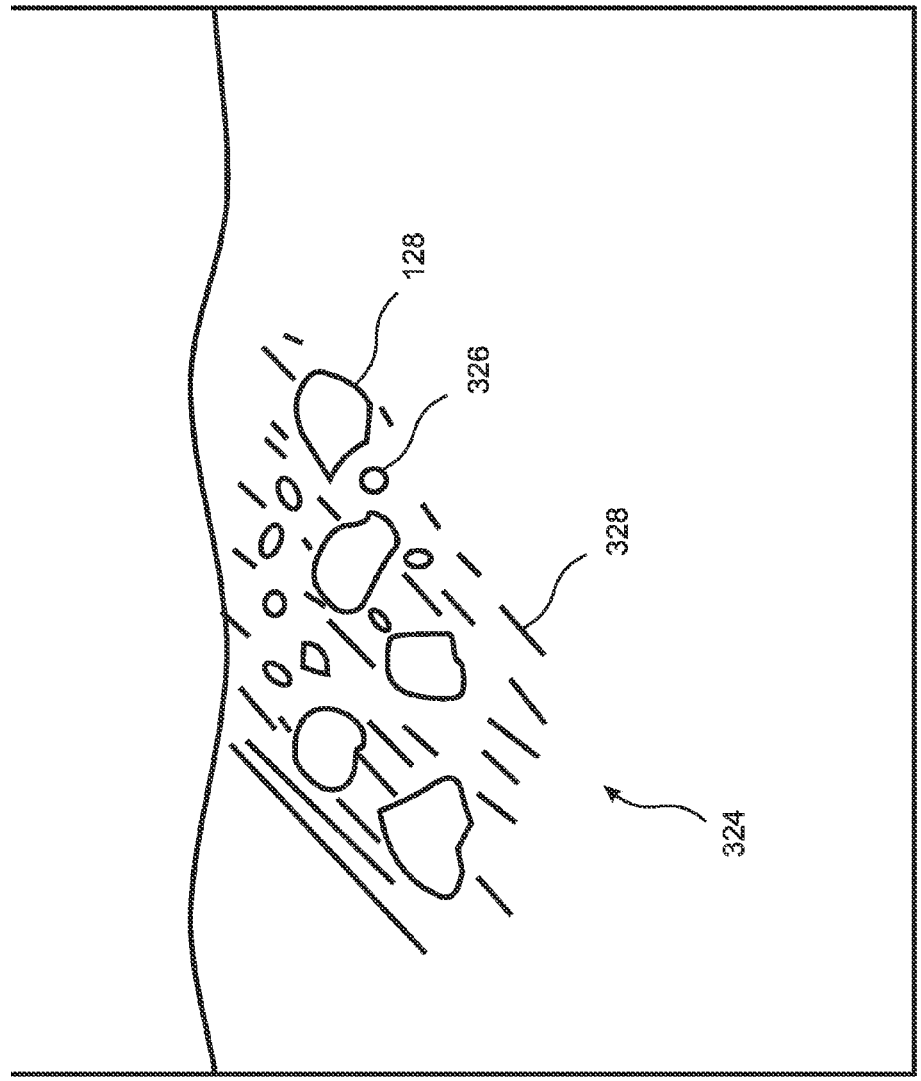
FIG. 3 is a cross-sectional illustration of a typical PC_NC slab mixture of the prior art, showing the excess of liquid and powder completely filling the spaces between the randomly oriented stone granules.
Figure 4:
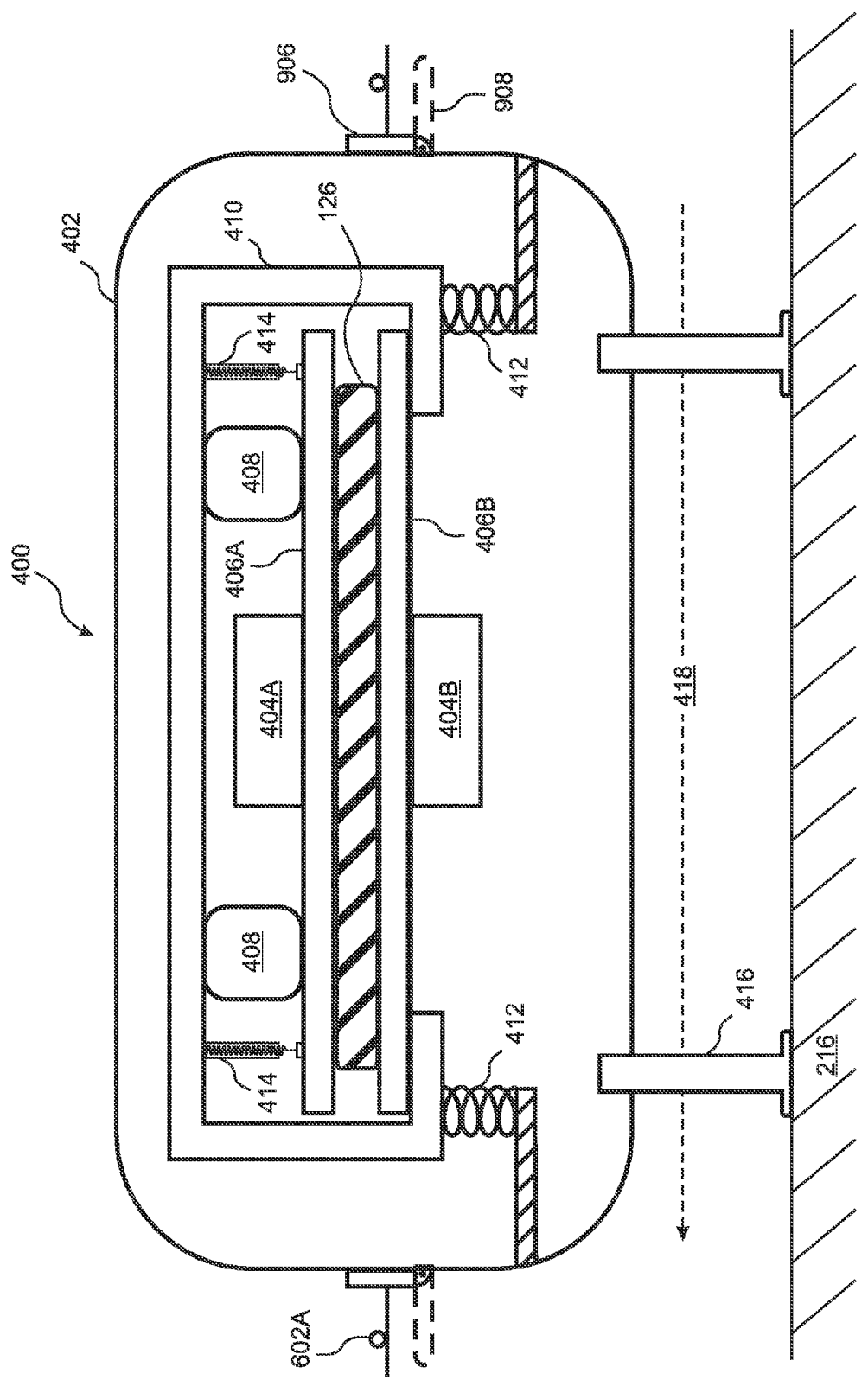
FIG. 4 is a cross-sectional illustration of a vacuum vibration press included in an embodiment of the present invention.

With reference to FIG. 4, these advantages are enabled at least partly by features of the VVP press 400 used in embodiments of the invention, which replaces the entire 350+ ton inertial base 222, 214 of the Breton press design 208 with a lightweight vibration table 406B below the slab 126 and a second vibrating device 404B below the table, in addition to the pressing plate 406A and upper vibration device 404A above the slab 126. In the embodiment of FIG. 4, a mounting bracket 410 supports the vibration table 406B, and in turn is supported by a vibration damping mechanism 412 that is fixed to the vacuum chamber 402. The upper pressing plate 406A is lowered onto the slab 126 and leveled by screw jacks 414, and then static pressure is applied to the slab by inflatable air bags 408, while vibrational energy is applied by the two vibration devices 404A, 404B. By applying vibrations to the slab mixture 126 from both above and below the slab 126, a high percentage of the vibrational energy is directed into the slab, so that the massive base 222, 214 of the Breton press is eliminated, and a return path 418 for a conveyor belt and/or for slab supporting trays or molds can be provided below the vacuum chamber 402. This in turn allows the use of rigid, self-supporting trays or molds, which can be automatically returned below the press to the mixer after the slab 132 has been transferred to the curing oven.

Figure 5A:
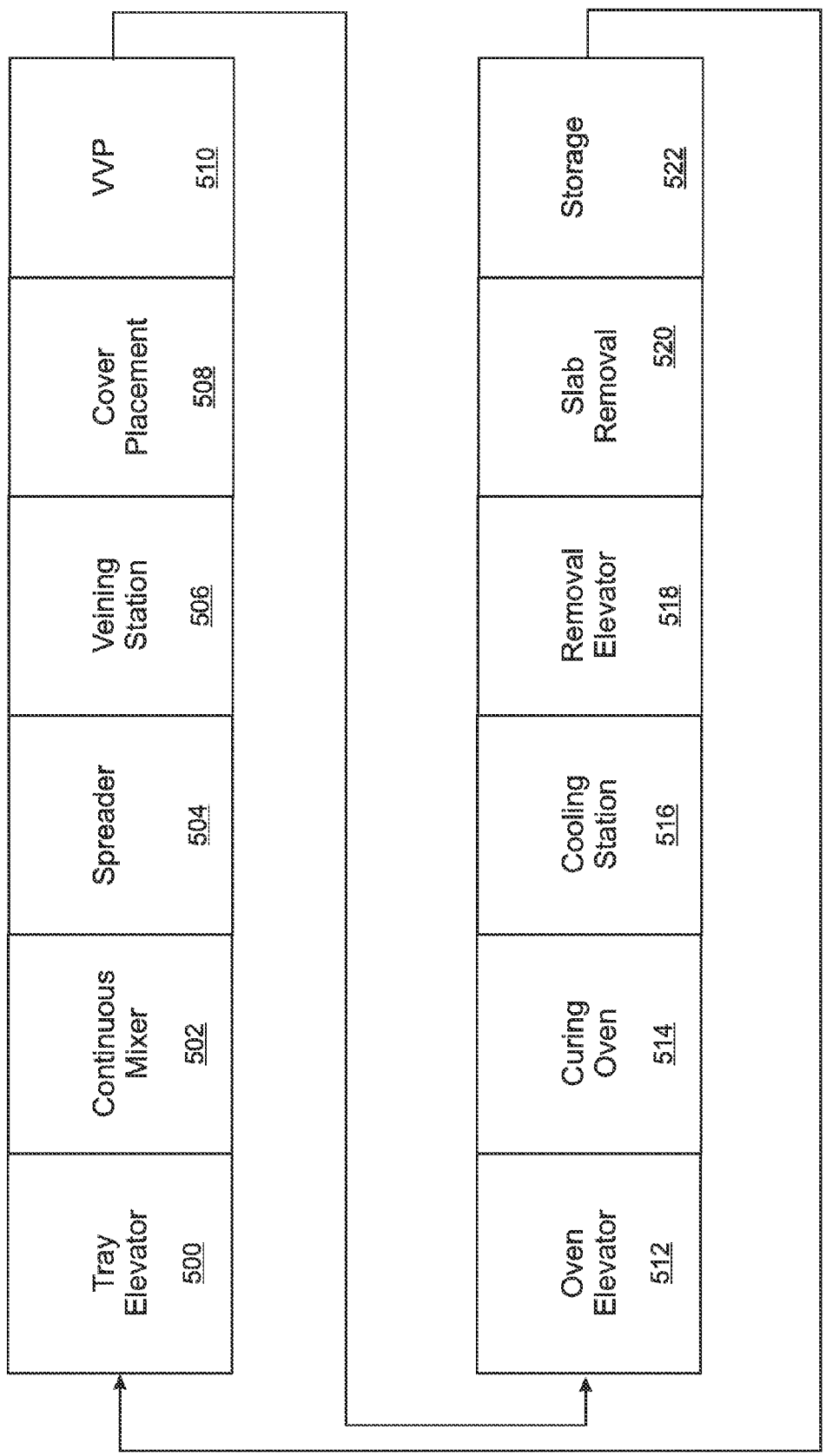
FIG. 5A is a flow diagram illustrating the steps included in the production of an engineered stone slab in an embodiment of the present invention.

FIG. 5A is a flow diagram of an embodiment of the present invention. A rigid, slab-supporting tray or mold is lifted by an elevator 500 to a level even with a roller system that extends from the tray elevator 500 to the curing oven 514. The tray or mold is transferred on the rollers to a location below a spreader 504, which is fed by a continuous mixer 502 that prepares the slab mixture. The slab mixture is deposited onto the tray or into the mold by the spreader 504, and optionally color patterns are added by a veining station 506, while the mold is moved back and forth and from side to side. This two-dimensional, horizontal movement of the tray or mold facilitates a uniform deposition of the slab mixture and application of a veining pattern while reducing or eliminating any need for movement of the spreader or veining station.

Depending on the embodiment, a cover is placed 508 onto the top of the slab 126. In some embodiments, the cover is a sheet of paper, a cover plate, or a set of corner sheets, as described in more detail below.

The slab 126 is then transferred into the VVP 510, where it is pressed and vibrated under vacuum to compress the slab mixture into a close-packed configuration that is free of voids. In embodiments, the tray or mold that is supporting the slab is transferred from the rollers onto an air cushion as it is transferred into the VVP 510, and then back onto rollers as it leaves the VVP 510.

After leaving the VVP 510, the slab 132 is translated vertically by an oven elevator 512 so that it can enter a holding slot in the curing oven 514. Unlike a Breton oven, the holding slots in the oven 514 of FIG. 5A are simply spaced-apart rollers (or in embodiments rollers on each side) that support the otherwise self-supporting trays or molds that carry the slabs 132. As a consequence, in embodiments air is able to flow relatively freely throughout the interior of the oven, so that heated air can be used to bring all regions of all contained slabs to a consistent temperature.

After curing, the slab 132 is transferred to a cooling station 516, and after cooing a removal elevator 518 removes the slabs 520 and transfers them to storage 522, or to a truck or other transporting device. Once the slab 132 has been removed, the empty tray or mold is returned beneath the VVP and back to the tray elevator 500.

Figure 5B:
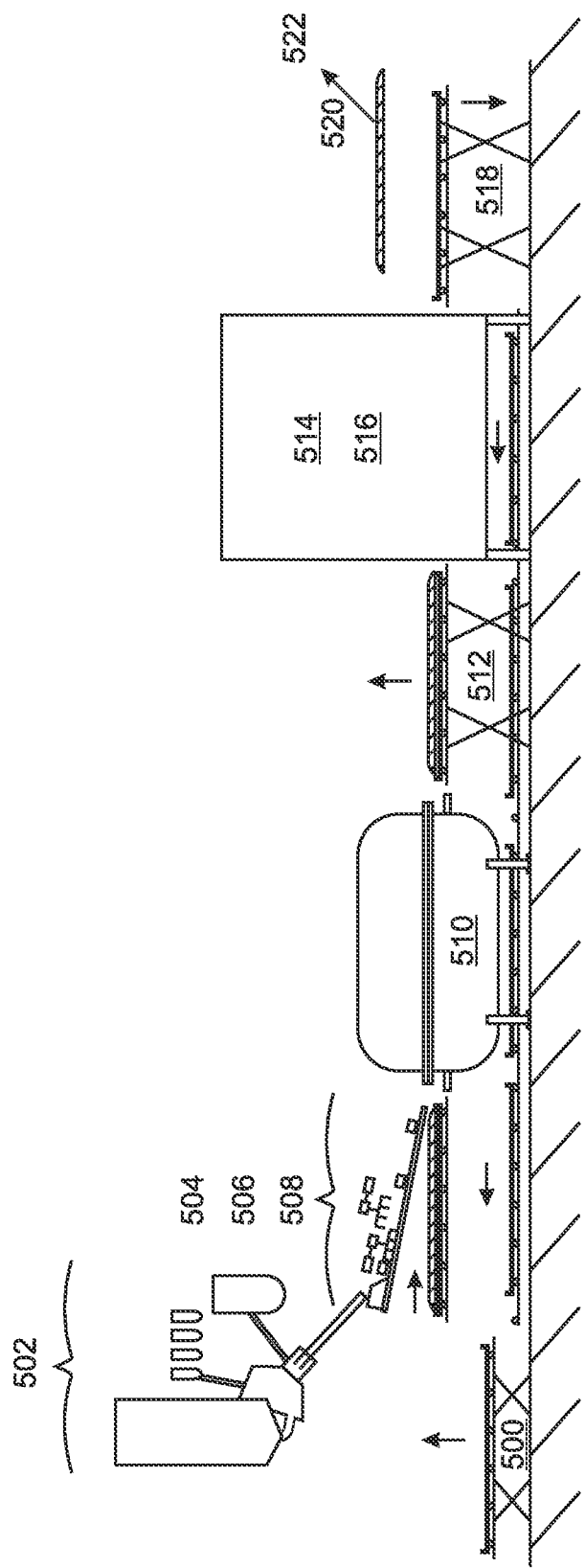
FIG. 5B is a block diagram illustrating a side view of components of the production plant used to implement the steps of FIG. 5A.

FIG. 5B is a simplified flow diagram that illustrates the interconnection between the elements of FIG. 5A. In the embodiment of FIG. 5B, the slab mixture 126 is supported by rigid molds transported on rollers. Empty molds are lifted by the "tray" elevator 500 into position to enter the mixing area, where a continuous mixer 502 and spreader 504 deposits slab mixture into the mold. The appearance of the mixture is further enhanced by a veining station 506, and according to the embodiment a cover plate is installed 508 (not separately illustrated). The filled mold then enters the VVP 510. After being compressed, the mold is raised or lowered by the oven elevator 512 so that it can enter one of the holding slots in the oven 514. After curing, the slab is cooled in a cooling station 516 (not separately illustrated), and then removed from the mold 520 and moved to a storage location 522, while the now empty mold is lowered by the removal elevator 518 and conveyed on a set of return rollers beneath the oven 514 and VVP 510 and back to the "tray" elevator 500.

Figure 6A:
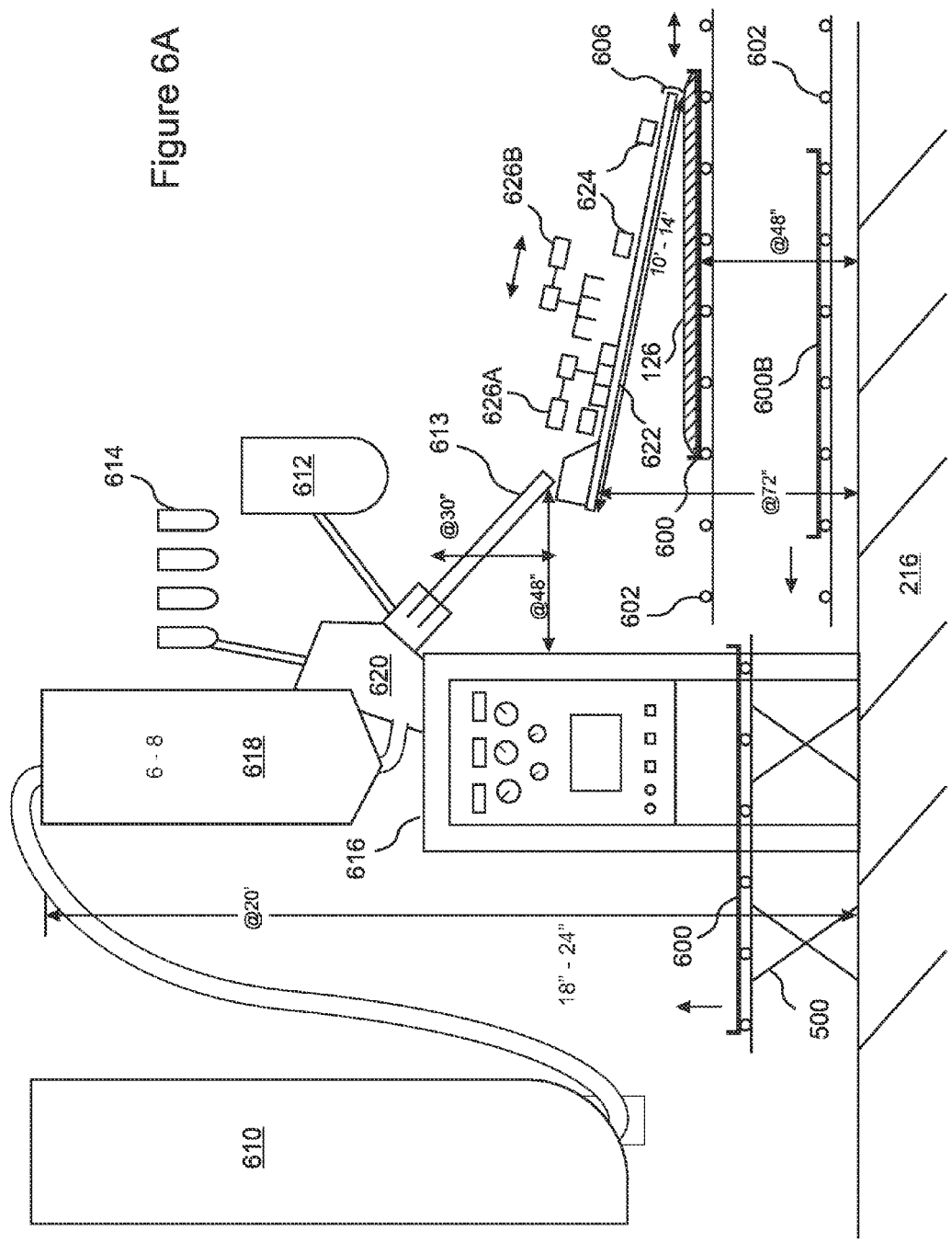
FIG. 6A is a block diagram illustrating a side view of components of a production plant used for mixing, coloring, and spreading a slab mixture in an embodiments of the present invention.
Figure 6B:
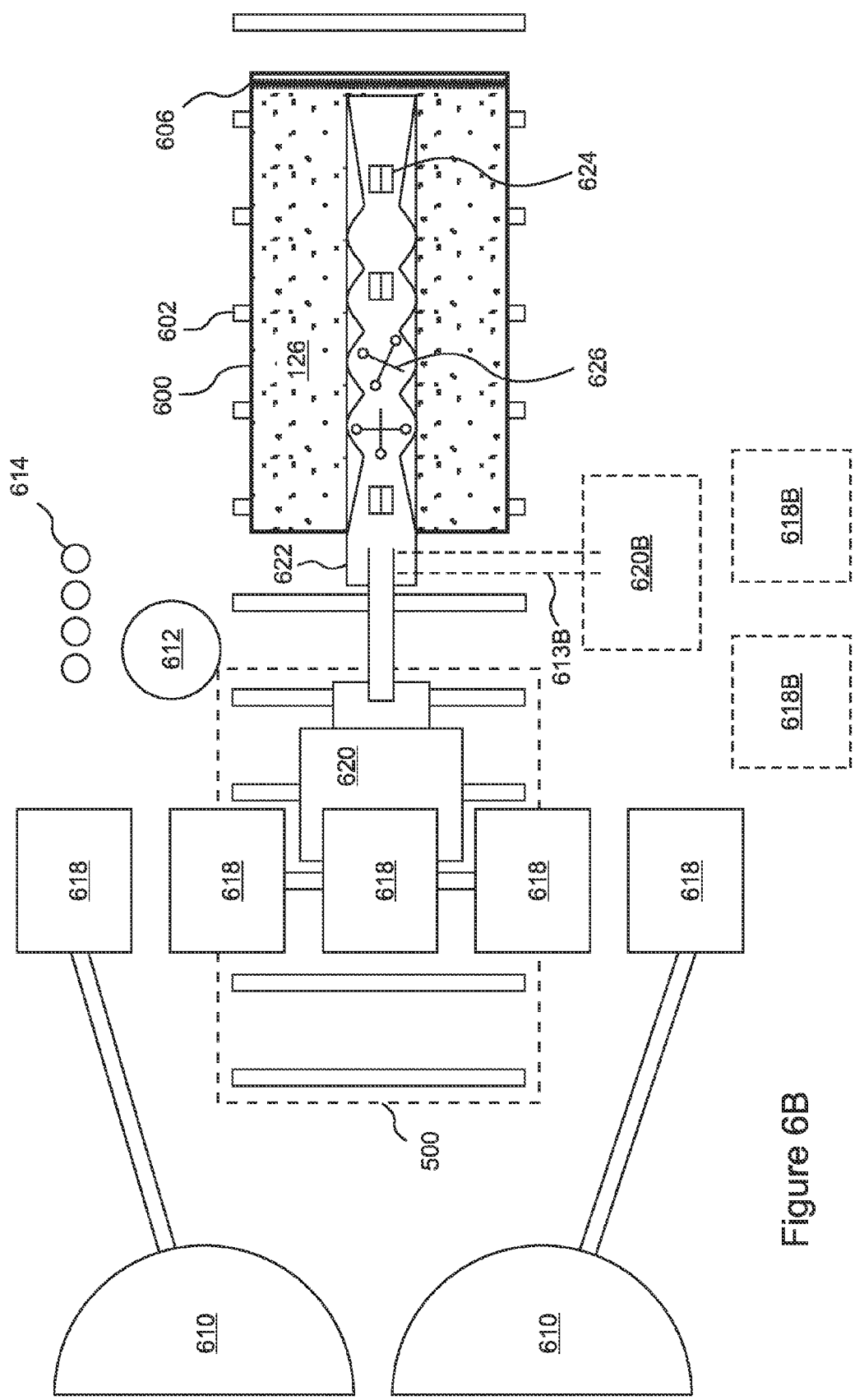
FIG. 6B is a top view of the components of FIG. 6A.

FIG. 6A is a side-view block diagram that illustrates the initial portion of a production plant in an embodiment of the present invention, in which the slab material is mixed and then a formed slab is prepared for entry into the VVP. FIG. 6B is a top view of the portion of the production plant shown in FIG. 6A. Dry raw materials are fed from hoppers 618 into a metering and blending device 620, and combined with resin from a resin tank 612 and optionally with dry and liquid pigment dispersions 614. The hoppers 618 are refilled from material stored in large bulk storage tanks and silos 610, each of which, in embodiments, can hold 20-100 tons of material. The combined ingredients are then mixed in a continuous mixer and discharge tube 613 and deposited onto an oscillating (side-to-side) conveyor spreader arm 622. In embodiments, the conveyor spreader arm 622 is s fitted with vibration devices (not shown) that assist in spreading and/or blending of the deposited mixture.

In the embodiment of FIGS. 6A and 6B, the conveyor spreader arm 622 includes dispenser devices and veining blades 624 that can be used to add powdered or liquid pigment dispersions to the slab mixture 224 as it moves down the conveyor spreader arm 622. The spreader arm 622 in FIGS. 5 and 6 also include rotating/oscillating mixer forks 626 that can be used to mix and blend several colors or veins into the mixture 224 in a controlled fashion to obtain a desired look. In FIG. 6A, mixer fork 626A is shown in a "down" or used position, while mixer fork 626 B is shown in an "up," unused position. The arrow shown above mixer fork 626B indicates that fork 626B can be moved with reference to fork 626A. The small boxes shown attached to the mixer forks 626 in FIG. 6A represent the motors and gearboxes used to drive the forks. Note that in FIG. 6A the two mixing forks 626 are shown as being as intertwined with each other.

When the mixture 222 reaches the end of the conveyor spreader arm 622, it is spread onto the rigid supporting tray or mold 600 by a spreader knife or other spreading device 606, which can be fixed or oscillating, and can include features such as vibration to help in evenly spreading the mixture onto the tray or mold 600. The small arrow shown to the right of the spreading device 606 indicates the ability of the tray or mold 600 to move forwards and backwards under the conveyor spreader arm 622 independently of movement of other trays and/or molds being processed by the production plant.

Note that in the embodiment of FIGS. 5A through 6B, the transporting mechanism that is used to transport the trays or molds includes rollers 602 on which the trays or molds are rolled. In similar embodiments the trays or molds are transported on a conveyor belt. In embodiments, the transporting mechanism 602 extends toward the VVP from approximately 12 feet before the spreader arm 622.

Also included in FIG. 6B are the dotted outlines of a second continuous mixer 613B, metering and blending device 620B, and raw material hoppers 618B. This second, optional mixer system can have a lower capacity (20-150 kg per minute) than the primary system, and also the ability to change the color of the output material rapidly (e.g. every 2-10 seconds), thereby permitting the blending of 2-5 different colors of slab mixture 224 to produce a multi-color, possibly veined result, such as an appearance similar to granite. In embodiments, these continuous mixer systems can be completely cleaned and changed to a new color (by one technician) in about 20 minutes, with the loss of only about 10-20 kg of material.

Figure 7A:
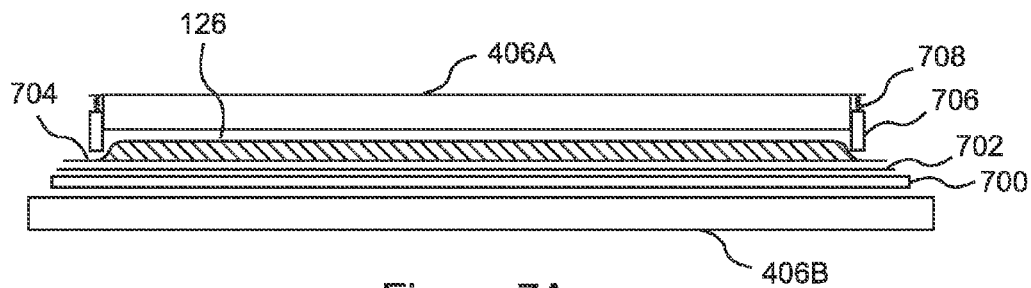
FIG. 7A is a cross-sectional side view of a pressing mechanism, slab, and supporting tray in an embodiment of the present invention in which the pressing mechanism includes extendable sides that are pressed downward onto the supporting tray during pressing of the slab mixture.

Once the formed slab mixture 126 has entered the VVP 510, it must be pressed and vibrated without distorting its slab shape. FIG. 7A is a cross-sectional side view of an embodiment in which the slab mixture 126 is supported by a rigid tray 700. In embodiments, the tray 700 is a rigid sheet of material, which can be made for example of metal, plastic, or a composite. The tray 700 fully supports the slab mixture 126 as it is transported into and out of the spreading area 500, the VVP 510, and the curing oven system 514. In the embodiment of FIG. 7A, the mixture rests on a bottom paper liner 702, and a second paper liner covers the mixture 126 from above 704. The upper press plate 406A includes downwardly extendable sides 706 driven by springs 708. When the press plate 406A is lowered onto the slab 126, the extendable sides 706 are pressed downward by the springs 708 against the tray 700, thereby causing the upper liner 704 to be wrapped around the sides of the slab 126. Accordingly, during pressing and vibration, the upper liner 704 forms a seal between the tray 700, the side walls 706, and the press plate 406A, and prevents any of the slab mixture 126 from being squeezed out through gaps in the mechanism.

Typically, the tray 700 is about 1-4 inches wider than the press plate 406A and side walls 706 on all sides, so that it can accommodate the lower 702 and upper 704 layers of paper, the side walls 706 of the press plate 406A, and/or rubber side walls, as discussed in more detail with reference to FIGS. 8A-8D below.

Figure 7B:
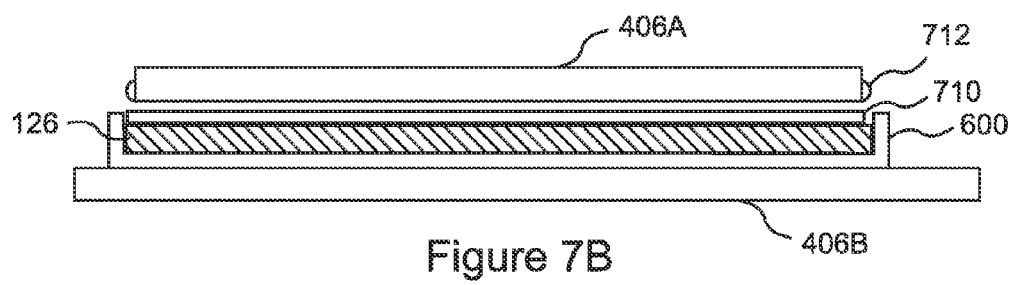
FIG. 7B is a cross-sectional side view of a pressing mechanism, slab, and supporting mold in an embodiment of the present invention in which the pressing mechanism includes a pressing plate with surrounding gasket that forms a seal with the mold during pressing of the slab mixture.

FIG. 7B is a cross-sectional view of a similar embodiment in which the slab mixture 126 is supported within a rigid mold 600. In this embodiment, the slab mixture 126 is covered by a rigid cover plate 710, and a seal is formed between the upper press plate 406A and the mold 600 by a gasket 712 that surrounds the upper press plate 406A. The cover plate 710 and/or mold 600, as well as the tray 700 of FIG. 7A, can be made of any rigid material that can withstand temperatures up to 100 degrees C. or more, which is the nominal temperature of the curing oven 514. The material must be able to remain rigid during movement along a roller-based conveyor system 602 and in the oven 614. The mold material should also not adversely dampen the vibration energy of the VVP 510. In various embodiments, the selected material is polished stainless steel, anodized aluminum (hard coat, black aluminum with or without first polishing the surface before anodizing), or another metal, fiberglass, fiber reinforced resin, ceramic, or glass. The tray 700 or mold 600 can be treated with a release agent that is appropriate to the resin used in the slab mixture 126, which can eliminate the need for paper sheets above and below the slab 126.

Figure 7C:
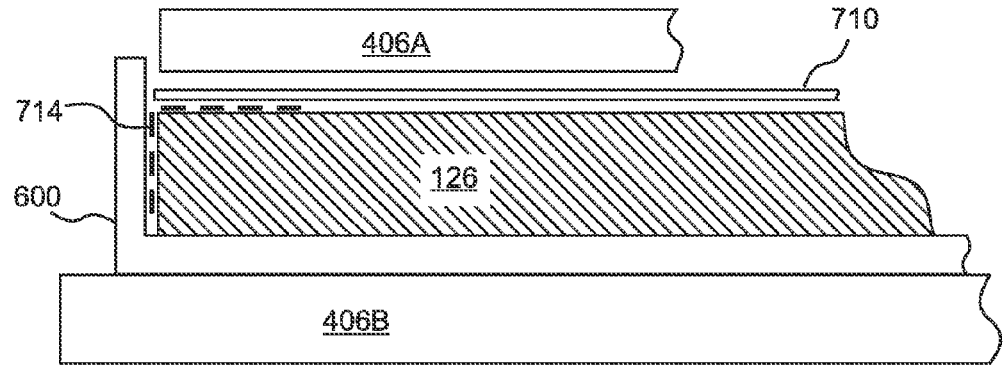
FIG. 7C is a cross-sectional side view of a pressing mechanism, slab, and supporting mold in an embodiment of the present invention that includes an angled strip forming a seal between the pressing mechanism and the slab mixture.
Figure 7D:
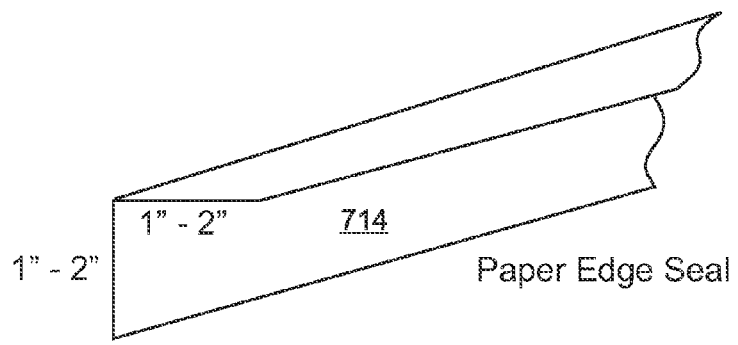
FIG. 7D is a partial perspective view of the angled strip of FIG. 7C.

FIG. 7C is a close-up cross-sectional illustration of an embodiment similar to FIG. 7B, except that a right-angle strip 714 is used to form a seal between the sides of the mold 600 and the press plate 406A. The right-angle strip 714 in the embodiment of FIG. 7C is placed around the perimeter of the slab mixture 126, just inside the walls of the mold 600, and forms a seal in a similar manner to the upper paper cover 702 of FIG. 7A, except that less material is required, thereby reducing weight and cost. The right-angle strip can be made of paper, thin plastic, or even thin metal. It is typically about 1-2" wide on each side, and long enough to extend about the entire slab perimeter. FIG. 7D is a close-up perspective view of the paper corner 714 of FIG. 7C.

Figure 8A:
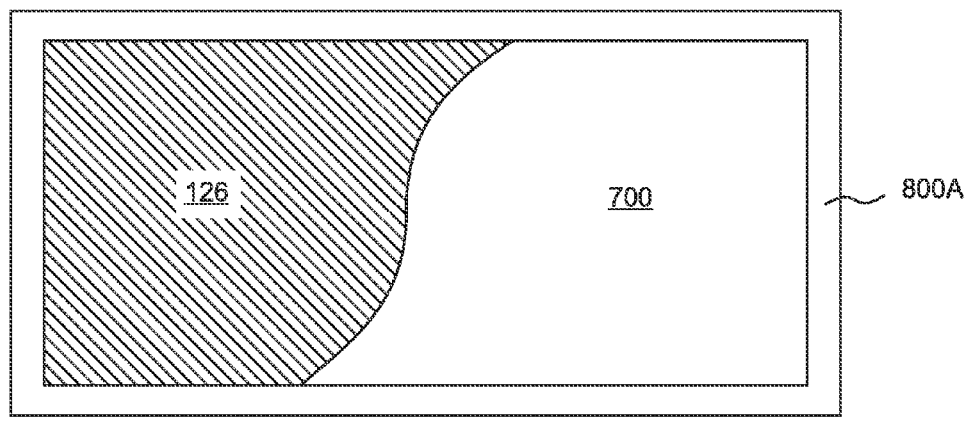
FIG. 8A is a top sectional view of a mold in an embodiment of the present invention having a flat bottom and removable, elastomeric sides.

FIG. 8A is a top cut-away view of an embodiment in which the slab mixture 126 is supported by a tray 700 and bounded by a wall 800A made from an elastomer such as a rubber or other somewhat compressible material. The combined tray 700 and wall 800A function together in a manner similar to the mold 600 of FIG. 7B. To make a "jumbo" slab (an industry standard size since 2009 which is about 132" long by 62" wide) the bounding wall 800A is only about 2-3" wide.

Figure 8B:
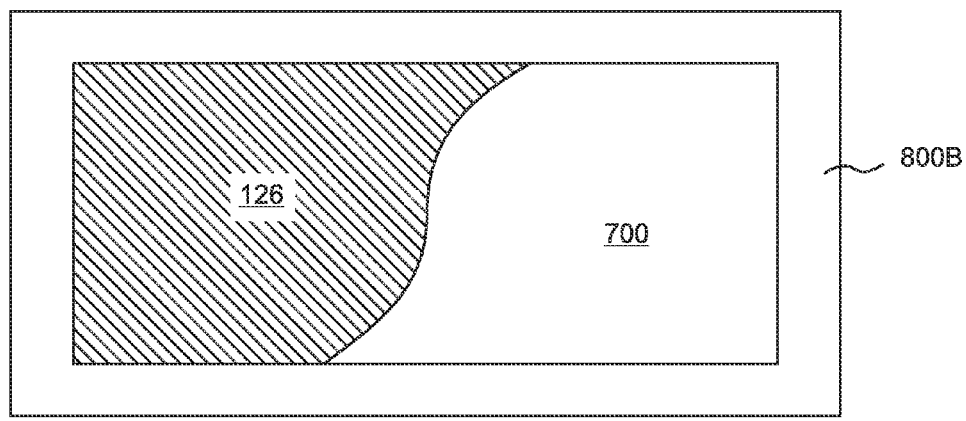
FIG. 8B is a top sectional view of the mold of FIG. 8A wherein the elastomeric sides have been replaced by sides having thicker walls.

As illustrated in FIG. 8B, this embodiment easily accommodates a change in the size of the slab 126 (for example to make a "standard" sized slab, which has been a standard since 2002 and is still widely used in industry) simply by exchanging to a different wall 800B that has an increased width. The height of the rubber wall 800A, 800B is also adjusted to fit the thickness of the desired slab 126, for example from 1 cm to 2 cm to 3 cm thick, etc.

Figure 8C:
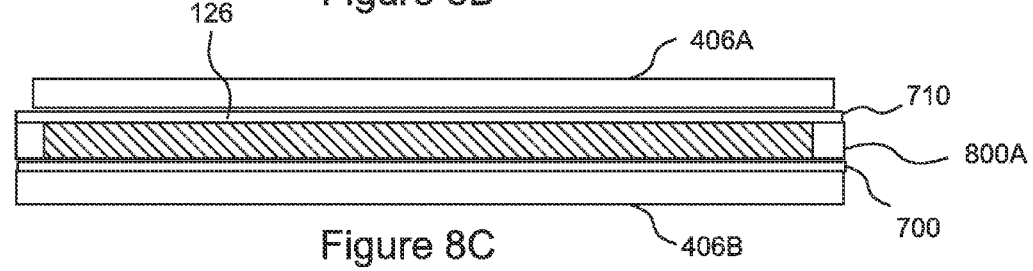
FIG. 8C is a cross-sectional side view of the mold of FIG. 8A shown in relation with a vibration table, cover plate, and pressing plate.
Figure 8D:
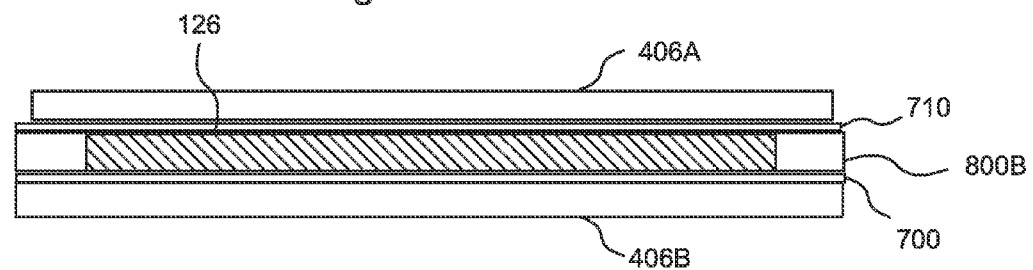
FIG. 8D is a cross-sectional side view of the mold of FIG. 8B shown in relation with a vibration table, cover plate, and pressing plate.

As illustrated in the side view of FIG. 8C, the elastomeric wall 800A makes a seal with the upper press plate 406A or cover plate 710 (if used), and is compressed as pressure is applied to the slab mixture 126. Accordingly, there is no need for a cover paper 704, gasket 712, right-angle strip 714, or any other special seal-forming mechanism. As shown in the side view of FIG. 8D, the only component that needs to be exchanged to change slab size is the rubber wall itself 800B.

FIG. 8E is a cross-sectional side view of a mold 600 and press plate 406A in an embodiment that allows for easy transitioning between different slab sizes when the slabs 126 are contained in rigid molds 600 rather than carried on trays 700. In this embodiment, the upper pressing plate 406A is adapted for smaller sizes of mold 600 by attaching a special platen 802 to the underside of the pressing plate 406A, using bolts 804 or by some other reversible attachment mechanism. In the embodiment of FIG. 8E, the bottom of the standard-size mold 600 extends beyond the mold sides so that it can be properly positioned as if it were a "jumbo" mold. The location of the side walls 806 for a "jumbo" mold 600 are shown in dashed lines in the figure. When a jumbo mold 600 is to be used, then the platen 802 is removed, and a different size of platen 802 is installed, or the pressing plate 406A itself is used without a platen 802. In these embodiments, a seal between the press plate 406A and the mold 600 can be formed by any of the mechanisms shown in FIGS. 7B through 7D, or by some other means.

FIG. 9 is a cutaway side view of a VVP 400 in an embodiment of the present invention. In this embodiment, the vacuum chamber 402 is cylindrical with rounded end-caps similar to a compressed air tank, which is strong lightweight and easy to fabricate. Other embodiments include vacuum chambers having other shapes. The entire device in the embodiment of FIG. 9 sits on between four and six legs 416, and is raised off the ground by a distance of between 8 and 15 inches in order to provide space for empty molds 600B to automatically return to the mixing station on the return roller-conveyor track 602B running underneath the vacuum chamber 402.

The vacuum chamber 900 is divided into upper and lower sections that are joined by precision milled flanges 902, 904 vacuum sealed to each other by an "O" ring (not shown) or another sealing mechanism known in the art. This allows for the upper section to be removed for maintenance and assembly.

The two halves of the vacuum chamber 900 are not separated during normal pressing operations. Instead, the slab mixture 126 enters and leaves the vacuum chamber 900 through openings that are covered by vacuum sealable doors, which are shown in the figure with solid lines in the closed position 906 and with dashed lines in the open position 908. Typically, these openings are about 8-10" tall and (for a "jumbo" size slab) about 72" wide, to allow entry and exit of slab 126 with tray 700 or mold 600. In the embodiment of FIG. 9, the slab mixture 126 is carried to the vacuum chamber in a mold 600 supported by rollers 602A. Once the mold 600 reaches the vibration table 406B, it is transferred from the rollers onto an air-cushion support plate 920 that is permanently attached to the vibration table 406B, as can be seen in the expanded detail 924. The air cushion support plate 920, which can be metal or plastic, includes small holes 922 that emit pressurized air to support the mold as it is transferred onto the vibration table 406B, and as it is removed after pressing.

The cutaway portion 900 of FIG. 9 reveals the vibration pressing device and other components that are within the vacuum chamber 900. In the embodiment of FIG. 9, the vibration table 406B supports two or more permanently attached "bridges" 910 comprising upright columns 912, connected on either side of the vibrating table 406B by cross beams 914, to which are attached airbags 408 that apply downward pressure on the top pressing plate 406A. The top pressing plate 406A is raised and lowered by precision screw jacks 414 or another suitable device that controls the height of the top pressing plate 406A in relation to the vibration table 406B, so that the thickness of the pressed slab 132 can be accurately controlled. In various embodiments, at least one screw jack 414 is located near each corner of the top pressing plate 406A.

In the embodiment of FIG. 9, the vibration table 406B, bridges 910, and top vibrating pressing plate 406A (attached to the bridges by the pressing airbags 408) are supported by lower vibration-suppressing airbags 916 that are attached to the inside of the vacuum chamber 402 by supports 918. In similar embodiments, other vibration damping mechanisms are used, such as springs. Accordingly, the vibration energy of the vibrating table 406B and the top vibrating press plate 406A is isolated from the vacuum chamber 402, and therefore from the floor 216 and the surrounding environment.

Figure 10:
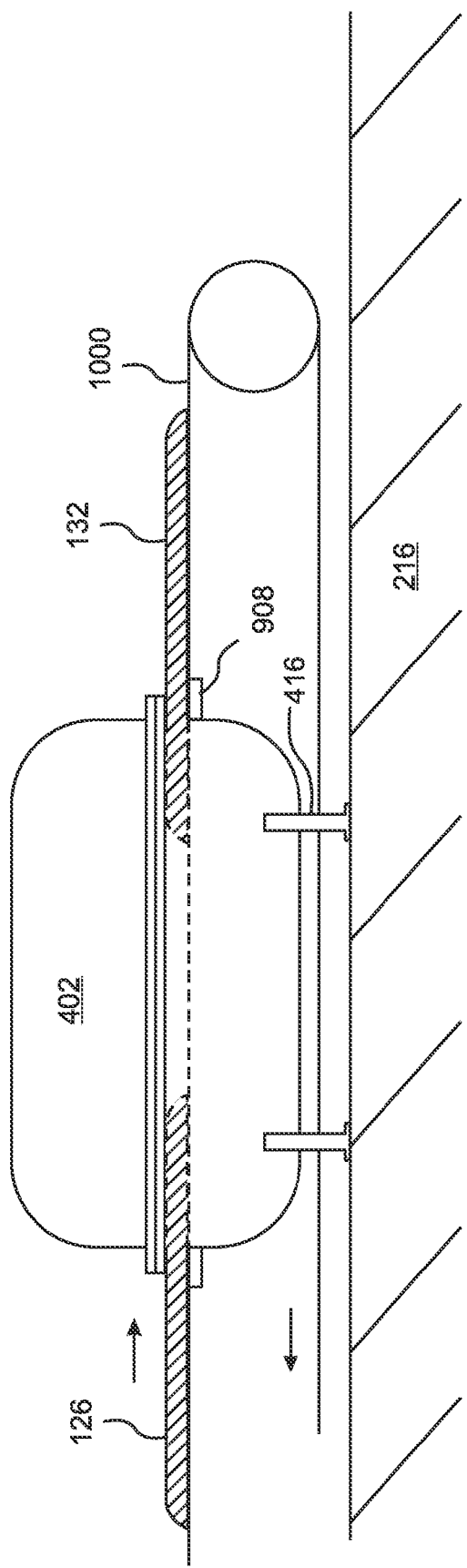
FIG. 10 is a side view of a VVP in an embodiment of the present invention wherein the slab mixture is transported on a conveyor belt.

FIG. 10 is a side view of an embodiment in which a conveyor belt 1000 is used instead of rollers and an air cushion to transport the slab mixture 126 into the vacuum chamber 402 and the pressed slab 132 out of the vacuum chamber 402. The conveyor belt 1000 can be used to transport slab mixtures 126 deposited onto paper sheets or rubber molds, as are used in traditional Breton presses 208, or it can be used to transport rigid trays 700 or molds 600 as described herein.

Figure 11:
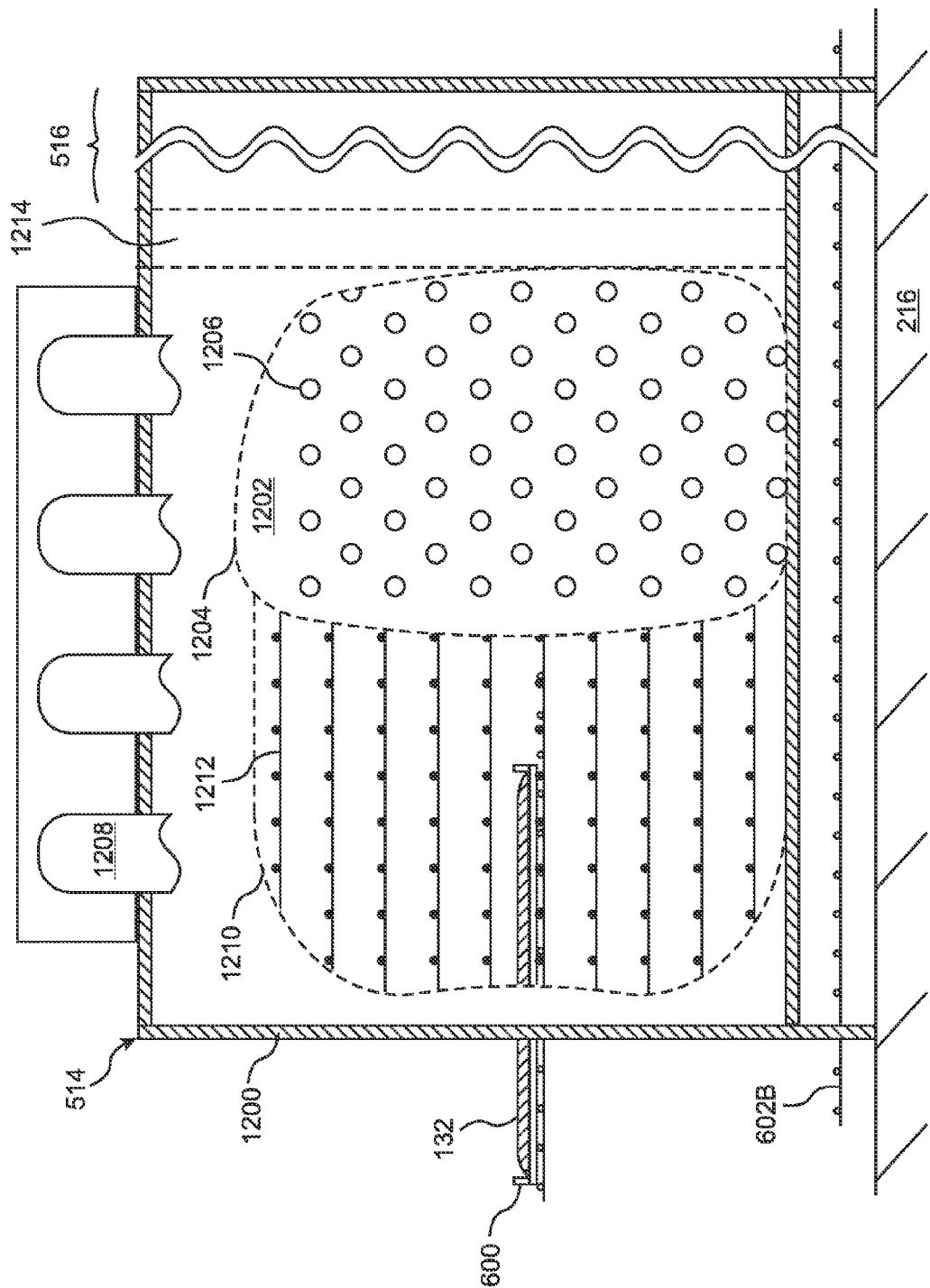
FIG. 11 is a sectional side view of a curing oven in an embodiment of the present invention.

FIG. 11 is a side cutaway view of a curing oven 514 in an embodiment of the present invention. After being lifted or lowered into position by the oven elevator 512, the tray 700 or mold 600 enters one of the holding levels 1212 in the oven 514, which can be seen through cutaway 1210. The oven is surrounded by thermally insulated walls 1200. Inside of the walls 1200 is a plenum 1202, which is visible in the figure through cutaway 1204. The plenum 1202 is penetrated by a plurality of holes 1206, which allow hot air delivered by ducts 1208 to enter the interior of the oven 514 and flow past and around the molds 600 containing the curing slabs 132. After the curing is complete, the mold leaves the oven 514, passes through a buffer region 1214, and enters a cooling section 516 where it slowly returns to ambient temperature.

Figure 12:
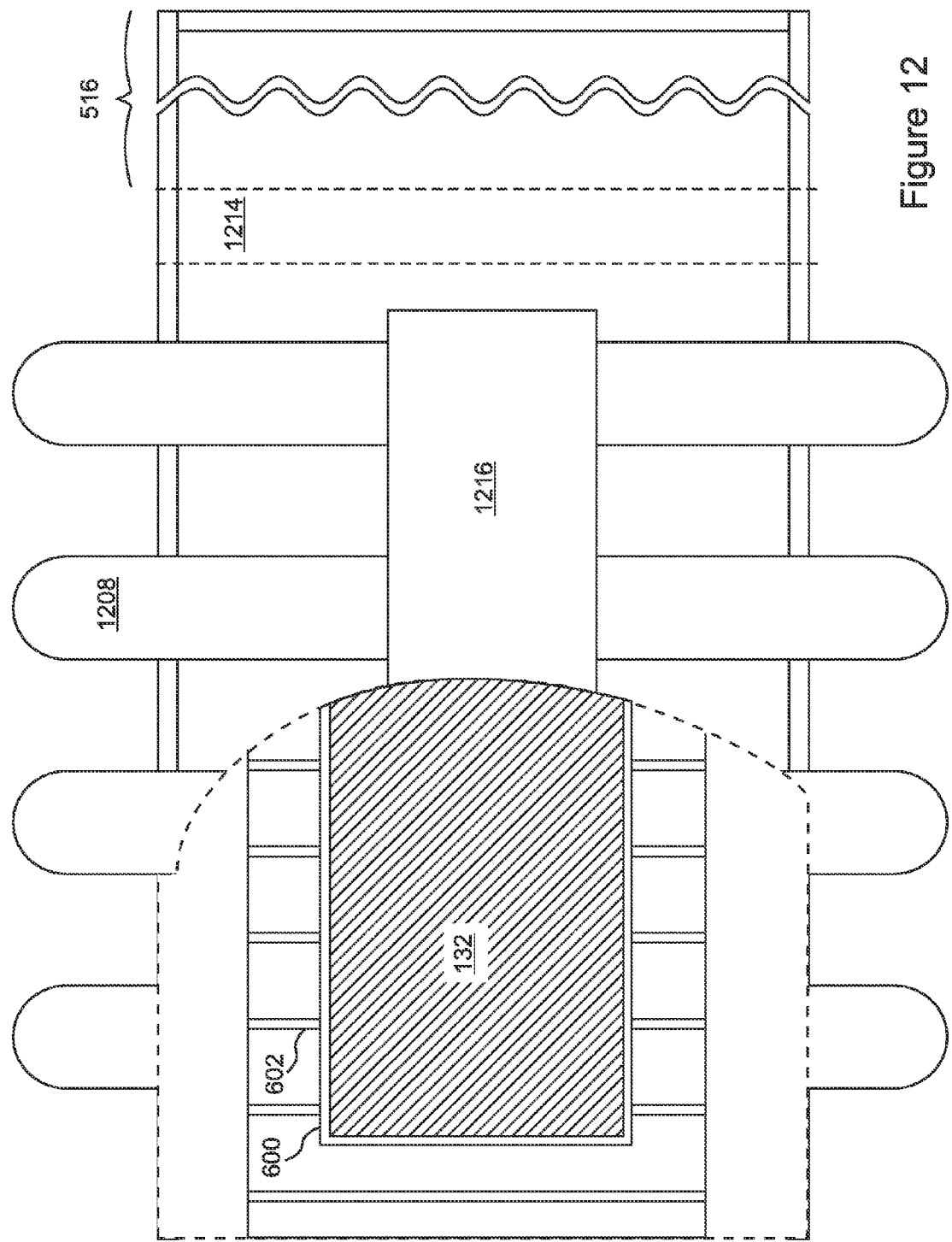
FIG. 12 is a top sectional view of the curing oven of FIG. 11.

FIG. 12 is a top cutaway view of the oven of FIG. 11. Visible in the figure is a central duct 1216 that delivers hot air to the individual ducts 1208, which then distribute the hot air to the plenum 1202.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application.

This specification is not intended to be exhaustive. Although the present application is shown in a limited number of forms, the scope of the invention is not limited to just these forms, but is amenable to various changes and modifications without departing from the spirit thereof. One or ordinary skill in the art should appreciate after learning the teachings related to the claimed subject matter contained in the foregoing description that many modifications and variations are possible in light of this disclosure. Accordingly, the claimed subject matter includes any combination of the above-described elements in all possible variations thereof, unless otherwise indicated herein or otherwise clearly contradicted by context. In particular, the limitations presented in dependent claims below can be combined with their corresponding independent claims in any number and in any order without departing from the scope of this disclosure, unless the dependent claims are logically incompatible with each other.

I claim:

1. A production plant for forming engineered composite stone slabs, the production plant comprising:
    a vacuum vibration press capable of applying vacuum, pressure, and vibrational energy to a formed slab mixture deposited onto or into a slab supporting structure, said slab mixture comprising stone granules, stone powder, and a resin binder, said resin binder being no more than 15% of the slab mixture by weight, said vacuum, pressure, and vibrational energy being applied in a combination of amplitudes that is sufficient to compress said formed slab mixture into a close-packed configuration in which all voids between the stone granules and stone powder are filled by said resin binder, said vacuum vibration press being suspended above a supporting floor, so that a passage is provided between said vacuum vibration press and said supporting floor; and
    a slab transporting system configured to transport said formed slab mixture into and out of said vacuum vibration press, a portion of said slab transporting system being directed through said passage formed between said vacuum vibration press and said supporting floor;

wherein the vacuum vibration press comprises:
a vibration table within a vacuum chamber, said vibration table being configured for supporting the formed slab mixture from below;
a pressing mechanism within the vacuum chamber, said pressing mechanism being configured for applying pressure to the formed slab mixture from above;
at least one lower vibration device cooperative with the vibration table; and
at least one upper vibration device cooperative with said pressing mechanism.

2. The production plant of claim 1, wherein the slab transporting system includes a conveyor belt that extends through said vacuum vibration press and returns through said passage between said vacuum vibration press and said supporting floor.

3. The production plant of claim 1, wherein the slab transporting system is configured to enable the slab supporting structure to move in at least two orthogonal directions while the slab mixture is deposited onto or into the slab supporting structure.

4. The production plant of claim 1, wherein the slab transporting system includes rollers upon which the rigid tray or mold can be rolled, said rollers including rollers that allow said slab supporting structure, after said engineered stone slab is removed therefrom, to be rolled below said vacuum vibration press in preparation for deposition of slab mixture onto or into the slab supporting structure.

5. The production plant of claim 1, wherein the slab transporting system is configured to enable a plurality of slab supporting structures to move independently of each other in at least one horizontal direction.

6. The production plant of claim 1, further comprising a continuous mixer configured for preparing said slab mixture by mixing together said stone granules, stone powder, and resin binder.

7. The production plant of claim 6, wherein said continuous mixer can produce up to 100 kg per minute of the slab mixture.

8. The production plant of claim 6, wherein said continuous mixer can produce up to 300 kg per minute of the slab mixture.

9. The production plant of claim 1, further comprising an air-cushion mechanism configured to support the formed slab mixture as it is transported into and out of the vacuum vibration press.

10. The production plant of claim 1, wherein the slab transporting mechanism includes at least one slab elevator configured to adjust a height of the slab-transporting system above the supporting floor.

11. The production plant of claim 1, wherein the slab supporting structure is a paper sheet or an elastomeric mold.

12. The production plant of claim 1, wherein the slab-supporting structure is a mold having a flat center bounded by vertical walls, and said production plant further comprises a rigid cover plate configured for placement on top of the formed slab mixture within said vertical walls during pressing of the formed slab mixture.

13. The production plant of claim 1, wherein the slab supporting structure is a rigid tray or a rigid mold.

14. The production plant of claim 1, further comprising a flexible cover sheet configured to overlay the formed slab mixture and to form a seal between the slab-supporting structure and the pressing mechanism during pressing of the formed slab mixture.

15. The production plant of claim 1, wherein the slab-supporting structure is a flat structure, and the pressing mechanism further includes extendable sides configured to be extended toward and pressed against the supporting structure during pressing of the formed slab mixture, thereby horizontally confining the formed slab mixture during the pressing.

16. The production plant of claim 1, wherein the slab-supporting structure is a mold having a flat center bounded by vertical walls, and the pressing mechanism further includes a surrounding gasket configured to form a seal between the pressing mechanism and the vertical walls of the mold during pressing of the formed slab mixture by the pressing mechanism.

17. The production plant of claim 1, wherein the slab-supporting structure is a mold having a flat center bounded by vertical walls, and said production plant further comprises at least one angled strip having two parallel, joined sections forming a substantially right angle therebetween, said angled strip being configured to extend one of said sections between the formed slab mixture and at least one of the vertical walls, while the other of said sections overlaps a top surface of the formed slab mixture, said angled strip thereby forming a seal between the at least one vertical wall of the mold and the pressing mechanism during pressing of the formed slab mixture.

18. The production plant of claim 1, wherein the slab-supporting structure is a mold having a flat bottom overlapped by vertical, elastomeric, removable walls having a first wall thickness, said walls being configured to form a seal between the flat bottom and the pressing mechanism during pressing of the formed slab mixture.

19. The production plant of claim 18, wherein an interior dimension of said mold can be changed by replacing at least one of said removable walls with a wall having a second wall thickness that differs from the first wall thickness.

20. The production plant of claim 18, wherein the elastomeric, removable walls are formed by a single, rectangular, elastomeric form that is configured to surround the formed slab mixture in the mold.

21. The production plant of claim 1, further comprising:
a plurality of slab-supporting molds having flat centers bounded by vertical walls; and
a plurality of platens configured to fit within the vertical walls of corresponding molds, said platens being exchangeably attachable to a bottom surface of a pressing plate included in the pressing mechanism;
at least one dimension of the formed slab mixture being selectable from among a plurality of sizes by selecting a corresponding mold and platen from among said pluralities of molds and platens.

22. The production plant of claim 1, further comprising a curing oven configured for heating the formed and pressed slab mixture by exposing the formed and pressed slab mixture to heated air.

23. The production plant of claim 22, wherein the curing oven includes a cooling section configured to allow the hardened engineered stone slab to return to ambient temperature after the curing thereof.

* * * * *